US012711446B2

(12) United States Patent
Shi et al.

(10) Patent No.: US 12,711,446 B2
(45) Date of Patent: Aug. 18, 2026

(54) FEDERATED LEARNING METHOD AND SYSTEM SUITABLE FOR CARBON CREDIT EVALUATION, ELECTRONIC DEVICE, AND COMPUTER READABLE STORAGE MEDIUM

(71) Applicant: STATE GRID SMART GRID RESEARCH INSTITUTE CO., LTD., Beijing (CN)

(72) Inventors: Congcong Shi, Beijing (CN); Xiuli Huang, Beijing (CN); Jiaxuan Fei, Beijing (CN); Yujia Zhai, Beijing (CN); Pengfei Yu, Beijing (CN)

(73) Assignee: STATE GRID SMART GRID RESEARCH INSTITUTE CO., LTD., Beijing (CN)

( * ) Notice: Subject to any disclaimer, the term of this patent is extended or adjusted under 35 U.S.C. 154(b) by 99 days.

(21) Appl. No.: 18/681,946

(22) PCT Filed: Aug. 21, 2023

(86) PCT No.: PCT/CN2023/113983
§ 371 (c)(1),
(2) Date: Feb. 7, 2024

(87) PCT Pub. No.: WO2024/002389
PCT Pub. Date: Jan. 4, 2024

(65) Prior Publication Data

US 2024/0281745 A1 Aug. 22, 2024

(30) Foreign Application Priority Data

Jun. 27, 2022 (CN) ........................ 202210733412.0

(51) Int. Cl.
*G06Q 10/06* (2023.01)
*G06Q 10/0637* (2023.01)
*G06Q 30/018* (2023.01)

(52) U.S. Cl.
CPC ..... *G06Q 10/06375* (2013.01); *G06Q 30/018* (2013.01); *G06Q 2220/00* (2013.01)

(58) Field of Classification Search
CPC ...................................................... G06Q 10/06
See application file for complete search history.

(56) References Cited

U.S. PATENT DOCUMENTS 12,160,504 B2 * 12/2024 Xu ........................ H04L 9/0819
2020/0358599 A1 * 11/2020 Baracaldo Angel ........................ G06F 21/6227

(Continued)

FOREIGN PATENT DOCUMENTS

CN 112001502 A 11/2020
CN 112668128 A 4/2021

(Continued)

OTHER PUBLICATIONS

International Search Report in the international application No. PCT/CN2023/113983, mailed on Oct. 24, 2023, 2 pages.

*Primary Examiner* — Nga B Nguyen
(74) *Attorney, Agent, or Firm* — Syncoda LLC; Feng Ma

(57) ABSTRACT

A federated learning method includes: obtaining a target federated sub-model of a target participating node, the target federated sub-model being obtained upon dividing up a federated model, the federated model comprising at least three federated sub-models, and the target federated sub-model comprising a model parameter and a target feature of the target participating node; obtaining a current network delay and preset instances of optimization of the target feature; determining current instances of optimization on the basis of the difference between the current network delay (Continued)

and a preset network delay corresponding to the preset instances of optimization; performing local optimization on the target feature according to the current instances of optimization; and performing encrypted interaction of an optimization result of the target feature with other participating nodes, so as to optimize a model parameter and determine a target model parameter of the target federated sub-model.

11 Claims, 7 Drawing Sheets

(56) References Cited

U.S. PATENT DOCUMENTS

| | | | | |
|---|---|---|---|---|
| 2022/0210140 | A1* | 6/2022 | Dhunay | G06N 20/00 |
| 2022/0255764 | A1* | 8/2022 | Li | G06F 21/606 |

FOREIGN PATENT DOCUMENTS

| | | | |
|---|---|---|---|
| CN | 112994981 | A | 6/2021 |
| CN | 113992694 | A | 1/2022 |
| CN | 114818011 | A | 7/2022 |
| WO | 2021155671 | A1 | 8/2021 |

* cited by examiner

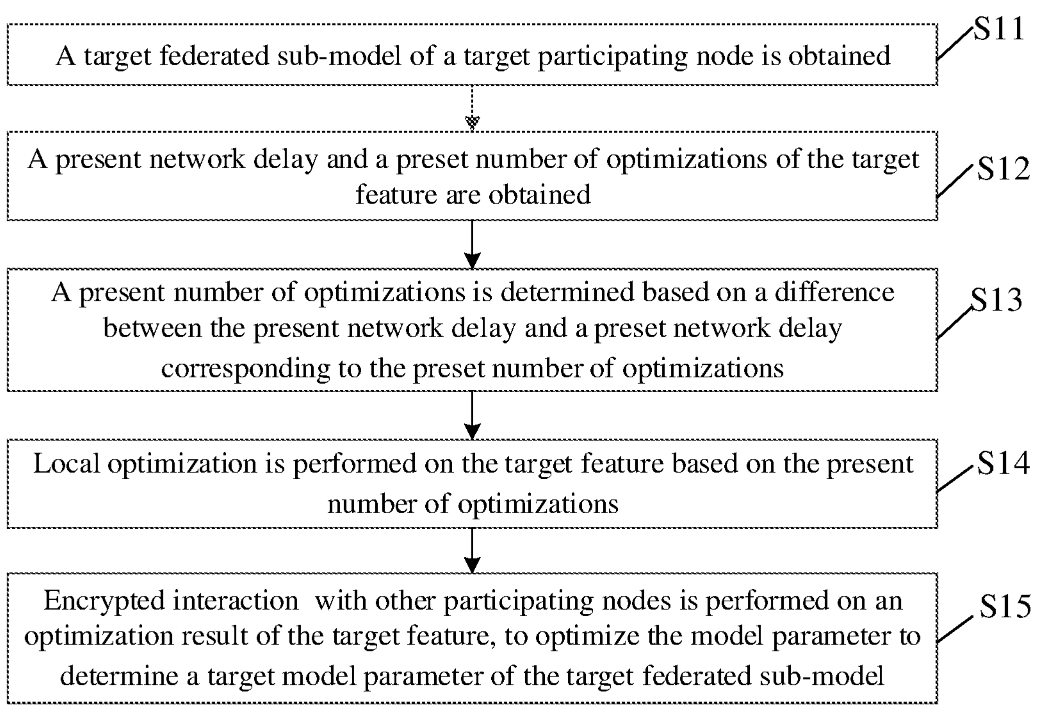

FIG. 1

A data feature is extracted from a data set as an original data feature

S21

An information entropy of the data feature is calculated and an attribute importance degree of the data feature is calculated based on the information entropy, to optimize the data feature and obtain a data depth feature

S22

The original data feature and the data depth feature are fused to obtain the target feature of the target participating node

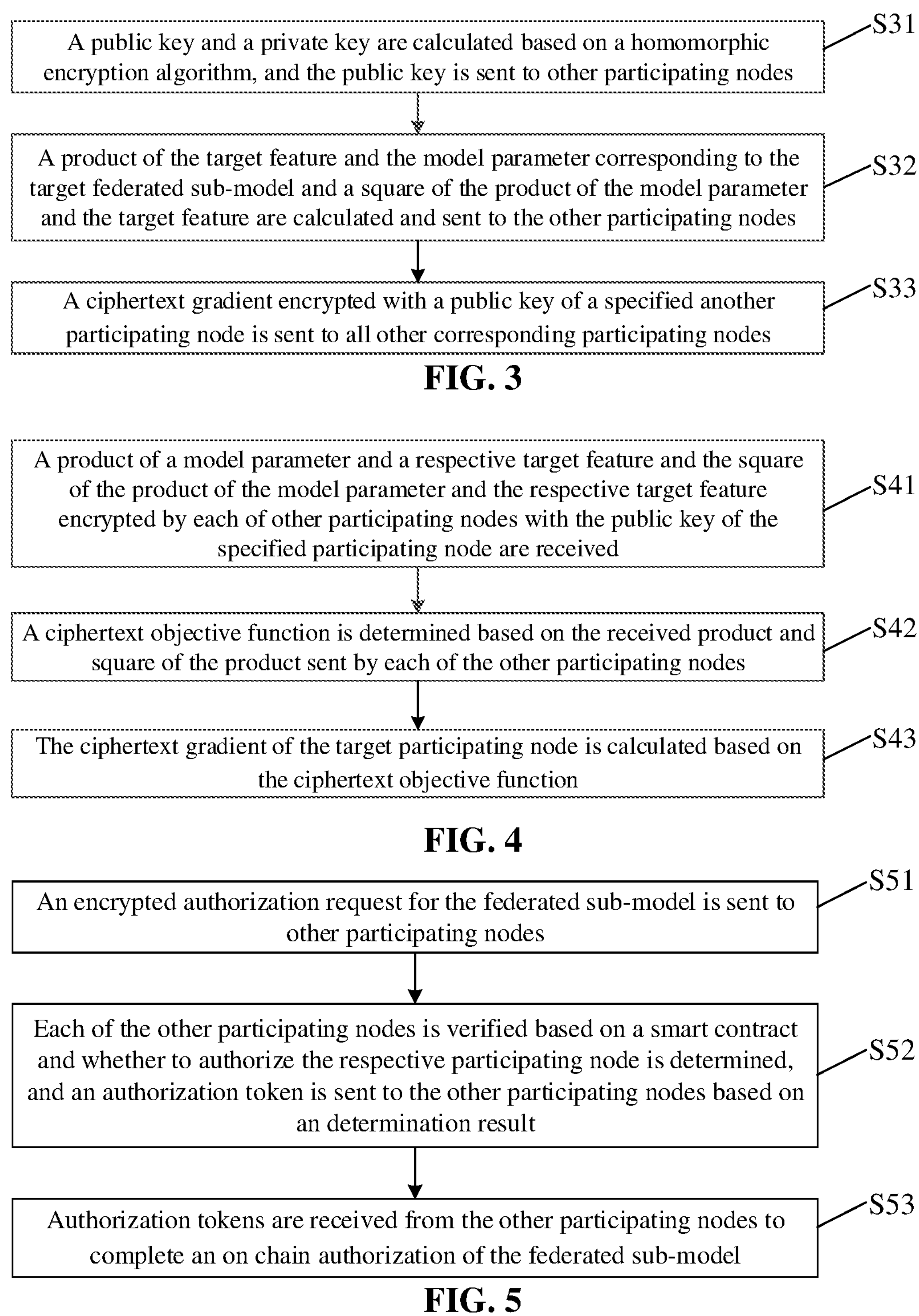
A public key and a private key are calculated based on a homomorphic encryption algorithm, and the public key is sent to other participating nodes
S31
A product of the target feature and the model parameter corresponding to the target federated sub-model and a square of the product of the model parameter and the target feature are calculated and sent to the other participating nodes
S32
A ciphertext gradient encrypted with a public key of a specified another participating node is sent to all other corresponding participating nodes
S33
FIG. 3
A product of a model parameter and a respective target feature and the square of the product of the model parameter and the respective target feature encrypted by each of other participating nodes with the public key of the specified participating node are received
S41
A ciphertext objective function is determined based on the received product and square of the product sent by each of the other participating nodes
S42
The ciphertext gradient of the target participating node is calculated based on the ciphertext objective function
S43
FIG. 4
An encrypted authorization request for the federated sub-model is sent to other participating nodes
S51
Each of the other participating nodes is verified based on a smart contract and whether to authorize the respective participating node is determined, and an authorization token is sent to the other participating nodes based on an determination result
S52
Authorization tokens are received from the other participating nodes to complete an on chain authorization of the federated sub-model
S53
FIG. 5

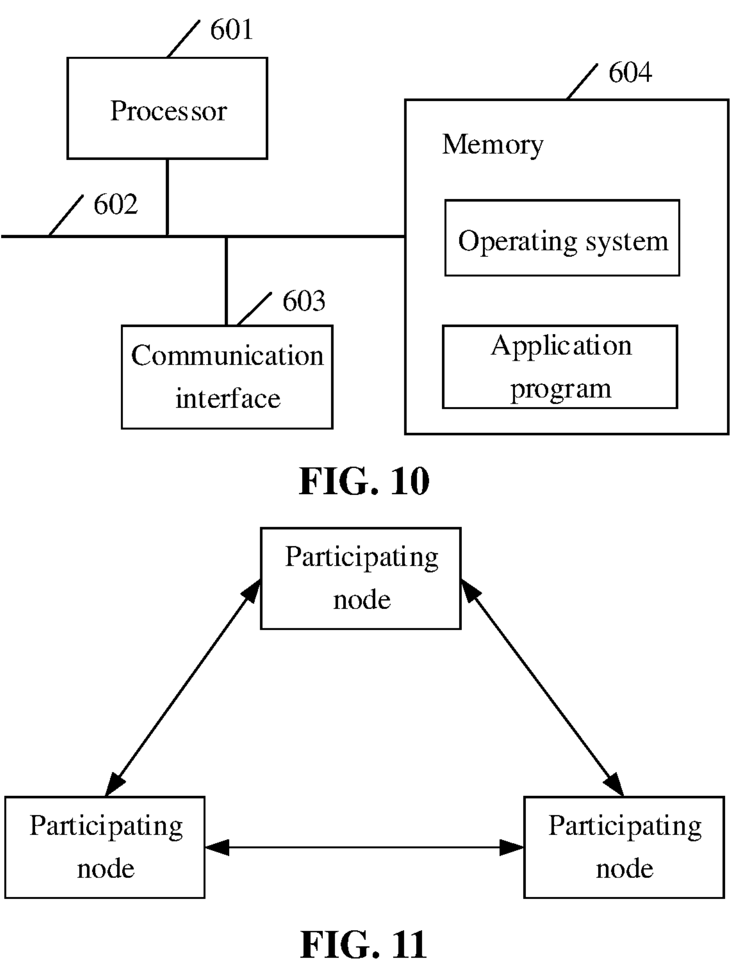
FIG. 10
FIG. 11
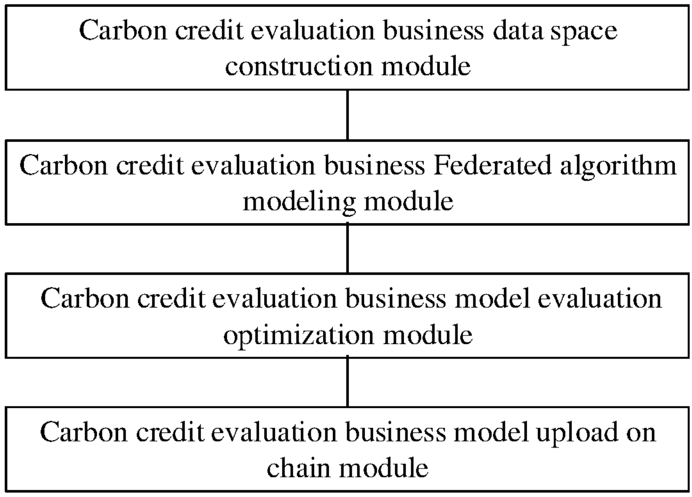
FIG. 12

FEDERATED LEARNING METHOD AND SYSTEM SUITABLE FOR CARBON CREDIT EVALUATION, ELECTRONIC DEVICE, AND COMPUTER READABLE STORAGE MEDIUM

CROSS-REFERENCE TO RELATED APPLICATIONS

This is a U.S. National Stage of International Application No. PCT/CN2023/113983 filed on Aug. 21, 2023, which claims priority to Chinese patent application No. 202210733412.0 filed Jun. 27, 2022. The disclosures of the above-referenced applications are hereby incorporated by reference in their entirety.

TECHNICAL FIELD

The invention relates to the field of information security, and in particular to a federated learning method for carbon credit evaluation, a system, an electronic device and a computer-readable storage medium.

BACKGROUND

A blockchain technology is a decentralized distributed database technology, which has a characteristic of decentralization and difficulty in tempering. Information recorded by blockchain is authentic and reliable. With the rapid development of network technologies, technologies related to blockchain are becoming more and more sound and mature.

Federated learning is a new artificial intelligence basic technology in which machine learning with high efficiency is carried out among multi-participants or multi-computing nodes, on the premise of ensuring information security during big data exchange, protecting privacy of terminal data and personal data, and ensuring legal compliance. The federated learning adopts a decentralized distributed system to ensure the privacy of users. The blockchain, as a decentralized, encrypted and tamper-proof distributed shared database, can provide data confidentiality of data exchange in federated learning, thus ensuring data security among various participants.

Due to the improvement of data privacy protection laws and regulations, integration of data resources in different industries through data concentration and data exchange may suffer from more restrictions and risks when data of multi-participants is needed, and it is necessary to protect the privacy of the multi-party data in this process.

SUMMARY

Accordingly, a federated learning method for carbon credit evaluation, a system, an electronic device and a computer-readable storage medium are provided in embodiments of the present disclosure, to address the problem of insufficient security of the privacy during multi-party data interaction.

In a first aspect, there is provided a federated learning method for carbon credit evaluation in an embodiment of the present disclosure. The method includes the following operations.

A target federated sub-model of a target participating node is obtained. The target federated sub-model is obtained by splitting a federated model including at least three federated sub-models, and the target federated sub-model includes a model parameter and a target feature of the target participating node.

A present network delay and a preset number of optimizations of the target feature are obtained.

A present number of optimizations is determined based on a difference between the present network delay and a preset network delay corresponding to the preset number of optimizations.

The present number of optimizations is calculated by the following formula:

$$F_L = F_B * \left(1 + \frac{T_L - T_B}{T_B}\right)$$

where $F_B$ represents the preset number of optimizations, $F_L$ represents the present number of optimizations, $T_B$ represents the preset network delay corresponding to the preset number of optimizations, and $T_L$ represents the present network delay.

Local optimization on the target feature is performed based on the present number of optimizations.

Encrypted interaction with other participating nodes is performed on an optimization result of the target feature, to optimize the model parameter to determine a target model parameter of the target federated sub-model.

According to the federated learning method for carbon credit evaluation provided in the embodiments of the disclosure, the federated sub-models are distributed to various participating nodes each corresponding to a federated sub-model. The target participating node determines the present number of optimizations based on the network delay and the preset number of optimizations of the target feature, performs local optimization based on the present number of optimizations before the encrypted interaction and calculation are performed among the participating nodes, and determines the target model parameter of the target federated sub-model after the encrypted interaction and calculation are performed, thus improving safety of a multi-party participating model.

In an implementation, the operation that the encrypted interaction with the other participating nodes is performed on the optimization result of the target feature includes the following actions.

A public key and a private key are calculated based on a homomorphic encryption algorithm, and the public key is sent to the other participating nodes.

A product of the target feature and the model parameter corresponding to the target federated sub-model and a square of the product of the target feature and the model parameter are calculated and sent to the other participating nodes.

A ciphertext gradient encrypted with a public key of a specified participating node is sent to all other corresponding participating nodes.

In an implementation, before sending the ciphertext gradient encrypted with the public key of the specified participating node to all other participating nodes, the method includes the following operations.

A product of a model parameter and a respective target feature and the square of the product of the model parameter and the respective target feature encrypted by each of the other participating nodes with the public key of the specified participating node are received.

A ciphertext objective function is determined based on the received product and square of the product sent by each of the other participating nodes.

The ciphertext gradient of the target participating node is calculated based on the ciphertext objective function. The ciphertext gradient is encrypted with the public key of the specified participating node, and the ciphertext objective function is calculated by the following formula:

$$[L]=\sum_{i=1}^{N}-y_i([u_i^A]+[u_i^B]+[u_i^C])+\frac{1}{2}([u_i^A]+[u_i^B]+[u_i^C])+\frac{1}{8}[(u_i^A)^2]+\frac{1}{8}[(u_i^B)^2]+\frac{1}{8}[(u_i^C)^2]+\frac{1}{4}(u_i^A\times u_i^B)+\frac{1}{4}(u_i^B\times u_i^C)+\frac{1}{4}(u_i^A\times u_i^C)$$

The ciphertext gradient of the target participating node is:

$$\left[\frac{\partial L}{\partial \theta^c}\right]_A=\sum_{i=1}^{N}-[y_ix_i^C]+\frac{1}{2}[x_i^C]+\frac{1}{4}[u_i^Cx_i^C]+\frac{1}{4}[u_i^Ax_i^C]+\frac{1}{4}[u_i^Bx_i^C]$$

where L represents the ciphertext objective function, $y_i$ represents a global model prediction value, θ represents a model parameter of a federated sub-model corresponding to a participating node, $x_i$ represents a target feature corresponding to a participating node, $$u_i^A=\theta_Ax_i^A,\ u_i^B=\theta_Bx_i^B,\ u_i^C=\theta_Cx_i^C,\ \theta^C$$

represents the model parameter of the target federated sub-model, $$x_i^C$$

represents the target feature of the target participating node, and $$\left[\frac{\partial L}{\partial \theta^c}\right]_A$$

represents the ciphertext gradient encrypted with the public key of the specified participating node.

In an implementation, after sending the ciphertext gradient encrypted with the public key of the specified participating node to all other participating nodes, the method further includes the following operations.

A gradient result obtained by each of the other participating nodes decrypting the ciphertext gradient of the target participating node is received, to determine the target model parameter of the target federated sub-model.

According to the federated learning method for carbon credit evaluation provided by the embodiments of the disclosure, a homomorphic encryption algorithm is adopted to perform the encrypted interaction among participating nodes, and addition and multiplication are used to operate under ciphertext. Therefore, the safety in the data interaction among participating nodes can be ensured, and parameters in the federated sub-model can be obtained by using the training method.

In an implementation, before obtaining the target federated sub-model of the target participating node, the method further includes the following operations.

A data feature is extracted from a data set as an original data feature.

An information entropy of the data feature is calculated and an attribute importance degree of the data feature is calculated based on the information entropy, to optimize the data feature and obtain a data depth feature.

The original data feature and the data depth feature are fused to obtain the target feature of the target participating node.

In an implementation, the information entropy is calculated by the following formula:

$$H(X)=E[p(a_1),\ p(a_2),\ \ldots,\ p(a_n)]=-\sum_{j=1}^{n}p(a_i)\log_2 p(a_i)$$

where $p(a_i)$ represents a probability of each discrete message occurred, $H_{max}(x_i)$ is $H(X)=\log_2 n$, representing a maximum information entropy.

The attribute importance degree is calculated by the following formula:

$$AI_i=\frac{H_{max}(x_i)-H(x_i)}{H_{max}(x_i)}$$

where $AI_i$ represents the attribute importance degree, $H_{max}(x_i)$ represents the maximum information entropy and $H(x_i)$ represents an attribute information entropy.

In an implementation, the method may further include the following operations.

An encrypted authorization request for the federated sub-model is sent to the other participating nodes.

Each of the other participating nodes is verified based on a smart contract and whether to authorize the respective participating node is determined, and an authorization token is sent to the other participating nodes based on a determination result.

Authorization tokens are received from the other participating nodes to complete an on-chain authorization of the federated sub-model.

In a second aspect, there is provided a federated learning system in an embodiment of the present disclosure. The system includes at least three participating nodes.

The at least three participating nodes each is configured to perform the federated learning method for carbon credit evaluation in the first aspect and any one implementation of the first aspect.

In a third aspect, there is provided an electronic device in an embodiment of the present disclosure. The electronic device includes a memory and a processor.

The memory is communicatively connected to the processor.

The memory stores a computer instruction which, when being executed by the processor, causes the processor to perform the federated learning method for carbon credit evaluation in the first aspect and any one implementation of the first aspect.

In a fourth aspect, there is provided a computer-readable storage medium in an embodiment of the present disclosure. The computer-readable storage medium has stored thereon a computer instruction which, when being executed by a computer, causes the computer to perform the federated learning method for carbon credit evaluation in the first aspect and any one implementation of the first aspect.

BRIEF DESCRIPTION OF THE DRAWINGS

In order to more clearly illustrate the solution of detailed description of the present disclosure or related art, the following figures which will be described in the detailed description of the present disclosure or related art are briefly introduced. It is apparent that the drawings are some implementations of the present disclosure, a person having ordinary skill in this field may obtain other figures according to these figures without paying inventive efforts.

FIG. 1 is a flowchart of a federated learning method according to an embodiment of the present disclosure.

FIG. 2 is a flowchart of determination of a target feature according to an embodiment of the present disclosure.

FIG. 3 is a flowchart of a method for encrypted interaction according to an embodiment of the present disclosure.

FIG. 4 is a flowchart of a method for encrypted interaction according to an embodiment of the present disclosure.

FIG. 5 is a flowchart of a federated learning method according to an embodiment of the present disclosure.

FIG. 10 is a schematic structure diagram of hardware of an electronic device according to an embodiment of the present disclosure.

FIG. 11 is a schematic structure diagram of a federated learning system according to an embodiment of the present disclosure.

FIG. 12 is a schematic diagram of function modules of a federated system for carbon credit evaluation according to an embodiment of the present disclosure.

DETAILED DESCRIPTION

Figure 6:
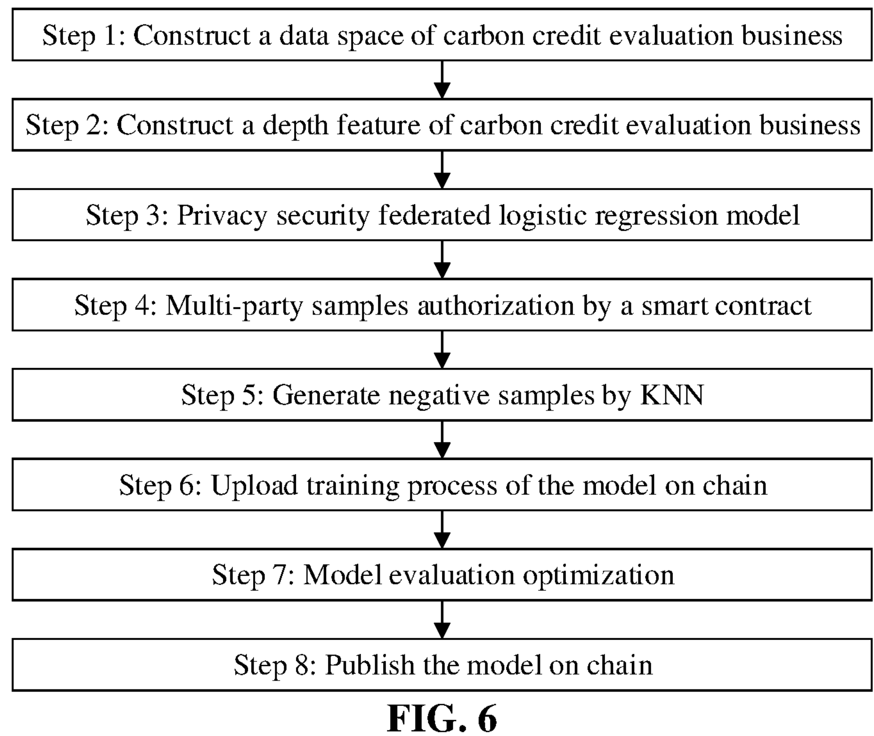
FIG. 6 is a flowchart of a federated learning method according to an embodiment of the present disclosure.

To make the purpose, technical solution, and advantages of the embodiments of the disclosure clearer, the technical solution of the present disclosure will be described clearly and completely with reference to the accompanying drawings of the embodiments of the present disclosure. It is apparent that the embodiments described herein are parts of the embodiments of the present disclosure rather than entire embodiments of present disclosure. All other embodiments obtained by a person of skill in the art based on the embodiments of the disclosure without paying creative efforts shall fall within the protection scope of the disclosure.

As illustrated in FIG. 11, a federated learning system for carbon credit evaluation is provided in an embodiment of the present disclosure. The federated learning system includes at least three participating nodes each configured to perform a federated learning method. Carbon credit is a carbon emission measurement unit that countries or enterprises can enter a carbon trading market under a condition certificated by the United Nations or emission reduction organizations recognized by the United Nations, so as to reduce carbon emissions by means of increasing energy efficiency, reducing pollution or reducing development. Participating nodes in the federated learning system may include energy enterprises, environmental protection authorities and financial enterprises. The federated learning system suitable for carbon credit evaluation may include function modules as illustrated in FIG. 12, which is described as follows in detail.

According to an embodiment of the present disclosure, a federated learning method embodiment is provided, and it should be noted that steps illustrated in the flowcharts of the drawings may be performed, for example, in a computer system including a set of computer executable instructions. In addition, although logical orders are illustrated in the flowcharts, in some cases, the steps illustrated or described may be performed in a different order than that illustrated herein.

The federated learning method for carbon credit evaluation is provided in an embodiment of the disclosure, the method may be applied to a mobile phone, a computer, a tablet computer, etc. FIG. 1 is a flowchart of a federated learning method according to an embodiment of the disclosure, as illustrated in FIG. 1, and the flow includes the following operations.

At S11, a target federated sub-model of a target participating node is obtained.

The target federated sub-model is obtained by splitting a federated model including at least three federated sub-models. The target federated sub-model includes a model parameter and a target feature of the target participating node.

Herein, a multi-party federated model is constructed as needed. The federated model is a model based on federated learning. The federated model generally includes multi-party participating nodes. The participating nodes are business organizations participating in the federated model. Generally, the federated learning includes horizontal federated learning and vertical federated learning. The vertical federated learning corresponds to more than two different organizations. The federated sub-model corresponding to each participating node may be obtained by splitting the federated model. The federated model in the federated learning method of the solution may include at least three federated sub-models.

The target participating node is one of multiple participating nodes, and the target federated sub-model is a federated sub-model corresponding to the target participating node. The target federated sub-model includes a model parameter and a target feature of the target participating node. The target feature may be obtained by filtering and processing a data attribute of the participating node, and different participating nodes have their corresponding target features. It should be noted that the same calculation method is adopted for federated models corresponding to other participating nodes.

At S12, a present network delay and a preset number of optimizations of the target feature are obtained.

At S13, a present number of optimizations is determined based on a difference between the present network delay and a preset network delay corresponding to the preset number of optimizations.

In the federated learning system, each participating node may train the federated sub-model after obtaining the federated sub-model corresponding to the participating node. In the training process, the participating node needs to interact with other participating nodes to obtain the required data, and various participating nodes of the federated model may be distributed in various places. Therefore, communication efficiency in the network may have a great impact on the overall speed. If a speed of a communication network is slow, an interaction frequency among participating nodes may be appropriately reduced and the preset number of optimizations of the target feature (i.e., the number of local optimizations before the present interaction calculation) may be adjusted to obtain the present number of optimizations in order to improve interaction efficiency.

The present number of optimizations is calculated by the following formula:

$$F_L = F_B * \left(1 + \frac{T_L - T_B}{T_B}\right)$$

where $F_B$ represents the preset number of optimizations, $F_L$ represents the present number of optimizations, $T_B$ represents the preset network delay corresponding to the preset number of optimizations, and $T_L$ represents the present network delay.

At S14, local optimization is performed on the target feature according to the present number of optimizations.

The target feature corresponding to the participating node is optimized after determining the present number of optimizations.

At S15, encrypted interaction with other participating nodes is performed on an optimization result of the target feature, to optimize the model parameter to determine a target model parameter of the target federated sub-model.

Herein, the nature of the federated learning is secure cross-domain joint modeling, thus it is necessary to perform encrypted interaction and computation on participating nodes to protect a privacy of each of the participating nodes. The encrypted interaction and computation may adopt homomorphic encryption, differential privacy, oblivious transfer and so on. A gradient of the parameter of the federated sub-model is obtained based on the encrypted interaction and computation. The gradient may represent an optimization direction of the model parameter in the federated sub-model. The target model parameter of the target federated sub-model may be determined after a gradient which have a better optimized result is determined, thus completing the training of the federated sub-model.

The gradient of the parameter of the federated sub-model is calculated by the following formula:

$$L = \sum_{i=1}^{N} -y_i\left(u_i^A + u_i^B + u_i^C\right) + \ln\left(1 + e^{u_i^A + u_i^B + u_i^C}\right)$$

where L is a joint objective function and y is a global model prediction value.

$$\frac{\partial L}{\partial \theta_A} = \sum_i -\frac{1}{2} y_i x_{Ai} + \frac{1}{4} u_i x_{Ai}$$

$$\frac{\partial L}{\partial \theta_B} = \sum_i -\frac{1}{2} y_i x_{Bi} + \frac{1}{4} u_i x_{Bi}$$

$$\frac{\partial L}{\partial \theta_C} = \sum_i -\frac{1}{2} y_i x_{Ci} + \frac{1}{4} u_i x_{Ci}$$

where $$u_i^A = \theta_A x_i^A,\ u_i^B = \theta_B x_i^B,\ u_i^C = \theta_C x_i^C,$$

and $\theta_A$, $\theta_B$, and $\theta_C$ represent the model parameters of various federated sub-models, respectively, and $x_A$, $x_B$ and $x_C$ represent the target features of various federated sub-models, respectively. The target feature is a feature vector.

According to the federated learning method for carbon credit evaluation provided in the embodiments of the disclosure, the federated sub-models are distributed to various participating nodes each corresponding to a respective federated sub-model. The target participating node determines the present number of optimizations based on the network delay and the preset number of optimizations of the target feature, performs local optimization based on the present number of optimizations before the encrypted interaction and calculation are performed among the participating nodes, and determines the target model parameter of the target federated sub-model after the encrypted interaction and calculation are performed, thus improving safety of a multi-party participating model.

In the embodiment, a method for determining a target feature is provided. The method is used before obtaining the target federated sub-model of the target participating node, i.e., the method corresponds to operation S11 in the embodiment illustrated in FIG. 1. FIG. 2 is a flowchart of a method for determining a target feature according to an embodiment of the present disclosure. As illustrated in FIG. 2, the flow includes the following operations.

At S21, a data feature is extracted from a data set as an original data feature.

The participating node selects data features to construct the data set based on the requirements of the federated model to be constructed. Each participating node has a data set corresponding to the participating node, and a data feature is extracted from the data set as the original data feature of the participating node. The data feature may be a data attribute.

At S22, an information entropy of the data feature is calculated and an attribute importance degree of the data feature is calculated based on the information entropy, to optimize the data feature and obtain a data depth feature.

The information entropy of the data feature is calculated, and the importance degree of each data feature is measured based on the obtained information entropy, so as to optimize the attribute of data feature and avoid unimportant features participating in depth feature synthesis. Then, the data depth feature may be generated by feature processing. The feature processing includes feature enhancement, feature transformation, feature dimension reduction, feature selection, feature standardization, and the like.

In an implementation, the information entropy is calculated by the following formula:

$$H(X) = E[p(a_1), p(a_2), \ldots, p(a_n)] = -\sum_{j=1}^{n} p(a_i)\log_2 p(a_i)$$

where $p(a_i)$ represents a probability of each discrete message occurred, $H_{max}(x_i)$ is $H(X)=\log_2 n$, representing a maximum information entropy.

The attribute importance degree is calculated by the following formula:

$$AI_i = \frac{H_{max}(x_i) - H(x_i)}{H_{max}(x_i)}$$

where $AI_i$ represents the attribute importance degree, $H_{max}(x_i)$ represents the maximum information entropy and $H(x_i)$ represents an attribute information entropy.

At S23, the original data feature and the data depth feature are fused to obtain the target feature of the target participating node.

The obtained original data feature and data depth feature are fused to construct a data feature space, i.e., the target feature of the target participating node. It should be noted that each of other participating nodes also determines a respective target feature in the same way.

In the embodiment, a method for encrypted interaction is provided, i.e., the method corresponds to operation S15 in the embodiment illustrated in FIG. 1. FIG. 3 is a flowchart of a method for encrypted interaction according to an embodiment of the present disclosure. As illustrated in FIG. 3, the flow includes the following operations.

At S31, a public key and a private key are calculated based on a homomorphic encryption algorithm, and the public key is sent to the other participating nodes.

At S32, a product of the target feature and the model parameter corresponding to the target federated sub-model and a square of the product of the model parameter and the target feature are calculated and sent to the other participating nodes.

At S33, a ciphertext gradient encrypted with a public key of a specified another participating node is sent to all other corresponding participating nodes.

In the embodiment of the disclosure, the specified another participating node may be specified by the target participating node, i.e., may be any other participating node, and the target participating node is a leading party of the encrypted interaction. When the target participating node is the participating party of encrypted interaction, gradients of the target participating node and other participating nodes may be encrypted with the public key of the leading party participating node to obtain the ciphertext gradient, and the ciphertext gradient is sent to all other corresponding participating nodes.

The flow illustrated in FIG. 4 may also be performed before S33, the flow includes the following operations.

At S41, a product of a model parameter and a respective target feature and the square of the product of the model parameter and the respective target feature encrypted by each of the other participating nodes with the public key of the specified participating node are received.

At S42, a ciphertext objective function is determined based on the received product and square of the product sent by each of the other participating nodes.

At S43, the ciphertext gradient of the target participating node is calculated based on the ciphertext objective function.

The ciphertext gradient is encrypted with the public key of the specified participating node, and the ciphertext objective function is calculated by the following formula:

$$[L] = \sum_{i=1}^{N} -y_i([u_i^A] + [u_i^B] + [u_i^C]) + \frac{1}{2}([u_i^A] + [u_i^B] + [u_i^C]) + \frac{1}{8}[(u_i^A)^2] +$$

-continued $$\frac{1}{8}[(u_i^B)^2] + \frac{1}{8}[(u_i^C)^2] + \frac{1}{4}[u_i^A \times u_i^B] + \frac{1}{4}[u_i^B \times u_i^C] + \frac{1}{4}[u_i^A \times u_i^C]$$

The ciphertext gradient of the target participating node is:

$$\left[\frac{\partial L}{\partial \theta^C}\right]_A = \sum_{i=1}^{N} -[y_i x_i^C] + \frac{1}{2}[x_i^C] + \frac{1}{4}[u_i^C x_i^C] + \frac{1}{4}[u_i^A x_i^C] + \frac{1}{4}[u_i^B x_i^C]$$

where L represents the ciphertext objective function, $y_i$ represents a global model prediction value, θ represents a model parameter of a federated sub-model corresponding to a participating node, $x_i$ represents a target feature corresponding to a participating node, $$u_i^A = \theta_A x_i^A,\ u_i^B = \theta_B x_i^B,\ u_i^C = \theta_C x_i^C,\ \theta^C$$

represents the model parameter of the target federated sub-model, $$x_i^C$$

represents the target feature of the target participating node, and $$\left[\frac{\partial L}{\partial \theta^C}\right]_A$$

represents the ciphertext gradient encrypted with the public key of the specified participating node.

In an embodiment, after the operation S33, the method further includes the operation that a gradient result obtained by each of the other participating nodes decrypting the ciphertext gradient of the target participating node is received, to determine the target model parameter of the target federated sub-model.

The following description describes the above-mentioned method for encrypted interaction in detail. The method for encrypted interaction may adopt a Paillier homomorphic encryption algorithm for privacy security interaction. Taking the federated model including three federated sub-models as an example, assuming that parameters of a logistic regression model is θ, and $\theta_A$, $\theta_B$ and $\theta_C$ are the model parameters corresponding to the first participating node, the second participating node and the third participating node, respectively. Then the entire linear model, i.e., the federated model is:

$$h(x) = \theta^T x = \theta_A^T x_A + \theta_B^T x_B + \theta_C^T x_C$$

where x represents the target feature.

Logistic regression maps a prediction value generated by the federated model to 0 to 1 through an activation function as follows:

$$p(x)=\frac{1}{1+e^{-h(x)}}$$

Let $$u_i^A=\theta_A x_i^A,\ u_i^B=\theta_B x_i^B,\ u_i^C=\theta_C x_i^C,$$

the joint objective function is obtained as follows:

$$L=\sum_{i=1}^{N}-y_i\left(u_i^A+u_i^B+u_i^C\right)+\ln\left(1+e^{u_i^A+u_i^B+u_i^C}\right)$$

The model parameter θ may be obtained by minimizing the joint objective function.

Because the homomorphic encryption may only calculate a polynomial function, thus the Taylor formula may be used to perform expansion at 0 point, and the joint objective function is approximately simulated as:

$$L\approx\sum_{i=1}^{N}-y_i\left(u_i^A+u_i^B+u_i^C\right)+\frac{1}{2}\left(u_i^A+u_i^B+u_i^C\right)+\frac{1}{8}\left(u_i^A+u_i^B+u_i^C\right)^2+\ln 2$$

Therefore, for the first participating node, the second participating node and the third participating node, the gradients of the local sub-model parameters are:

$$\frac{\partial L}{\partial\theta_A}=\sum_i-\frac{1}{2}y_i x_{Ai}+\frac{1}{4}u_i x_{Ai}$$

$$\frac{\partial L}{\partial\theta_B}=\sum_i-\frac{1}{2}y_i x_{Bi}+\frac{1}{4}u_i x_{Bi}$$

$$\frac{\partial L}{\partial\theta_C}=\sum_i-\frac{1}{2}y_i x_{Ci}+\frac{1}{4}u_i x_{Ci}$$

In the calculation of vertical federated learning, the training of the model is completed when the gradient information is safely calculated and a convergence value of the objective function is found. The Paillier homomorphic encryption satisfies the addition and multiplication of ciphertext, and the encrypted interaction flow of the three parties is described as follows.

(1) Each of the three parties generates a respective homomorphic encrypted public and private key pair, and sends the respective public key to the other two parties.

(2) A party A with no tag calculates $$u_i^A \text{ and } (u_i^A)^2,$$

sends $$[u_i^A]_A \text{ and } [(u_i^A)^2]_A$$

encrypted with the public key of A to C and sends $$[u_i^A]_C \text{ and } [(u_i^A)^2]_C$$

to B.

(3) The party B with no tag calculates $$u_i^B \text{ and } (u_i^B)^2,$$

sends $$[u_i^B]_A \text{ and } [(u_i^B)^2]_A$$

encrypted with the public key of A to C and sends $$[u_i^B]_C \text{ and } [(u_i^B)^2]_C$$

to A.

(4) The party C with a tag calculates $$u_i^C \text{ and } (u_i^C)^2,$$

sends $$[u_i^C]_C \text{ and } [(u_i^C)^2]_C$$

encrypted with the public key of C to A and B.

(5) The party C with the tag calculates the ciphertext objective function by using $$[u_i^A]_A,\ [(u_i^A)^2]_A,\ [u_i^B]_A \text{ and } [(u_i^B)^2]_A$$

sent by A and B, and calculates a local gradient.

where the ciphertext objective function is:

$$[L]_A=\sum_{i=1}^{N}-y_i\left([u_i^A]+[u_i^B]+[u_i^C]\right)+\frac{1}{2}\left([u_i^A]+[u_i^B]+[u_i^C]\right)+\frac{1}{8}[(u_i^A)^2]+\frac{1}{8}[(u_i^B)^2]+\frac{1}{8}[(u_i^C)^2]+\frac{1}{4}[u_i^A\times u_i^B]+\frac{1}{4}[u_i^B\times u_i^C]+\frac{1}{4}[u_i^A\times u_i^C]$$

and the local gradient is:

$$\left[\frac{\partial L}{\partial\theta^C}\right]_A=\sum_{i=1}^{N}-[y_i x_i^C]+\frac{1}{2}[x_i^C]+\frac{1}{4}[u_i^C x_i^C]+\frac{1}{4}[u_i^A x_i^C]+\frac{1}{4}[u_i^B x_i^C]$$

(6) The party C with the tag selects a random mask $R_C$, and sends $$\left[\frac{\partial L}{\partial \theta^C} + R_C\right]_A$$

to A.

(7) A obtains $$\frac{\partial L}{\partial \theta^C} + R_C$$

by decryption and sends it to C.

(8) C acquires $$\frac{\partial L}{\partial \theta^C}$$

and updates the local parameter.

(9) The party A with no tag calculates the ciphertext objective function by using $$[u_i^B]_C,\ [(u_i^B)^2]_C,\ [u_i^C]_C \text{ and } [(u_i^C)^2]_C$$

sent by B and C:

$$\left[\frac{\partial L}{\partial \theta^A}\right]_C = \sum_{i=1}^{N} -[y_i x_i^A] + \frac{1}{2}[x_i^A] + \frac{1}{4}[u_i^A x_i^A] + \frac{1}{4}[u_i^B x_i^C] + \frac{1}{4}[u_i^C x_i^A]$$

(10) The party A with no tag selects a random mask $R_C$, and sends $$\left[\frac{\partial L}{\partial \theta^A} + R_A\right]_C$$

to C.

(11) The party C with the tag obtains $$\frac{\partial L}{\partial \theta^A} + R_A$$

by decryption and sends it to A.

(12) A acquires $$\frac{\partial L}{\partial \theta^A}$$

and updates the local parameter.

(13) The party B with no tag calculates the ciphertext objective function by using $$[u_i^A]_C,\ [(u_i^A)^2]_C,\ [u_i^C]_C \text{ and } [(u_i^C)^2]_C$$

sent by A and C.

$$\left[\frac{\partial L}{\partial \theta^B}\right]_C = \sum_{i=1}^{N} -[y_i x_i^B] + \frac{1}{2}[x_i^B] + \frac{1}{4}[u_i^B x_i^B] + \frac{1}{4}[u_i^A x_i^B] + \frac{1}{4}[u_i^C x_i^B]$$

(14) The party B with no tag selects a random mask $R_B$, and sends $$\left[\frac{\partial L}{\partial \theta^B} + R_B\right]_C$$

(15) The party C with the tag obtains $$\frac{\partial L}{\partial \theta^B} + R_B$$

by decryption and sends it to B.

(16) B acquires $$\frac{\partial L}{\partial \theta^B}$$

and updates the local parameter.

(17) Repeat the above operations (1) to (16) until the model converges.

According to the federated learning method provided by the embodiments of the disclosure, a homomorphic encryption algorithm is adopted to perform the encrypted interaction among participating nodes, and addition and multiplication are used to operate under ciphertext. Therefore, the safety in the data interaction among participating nodes can be ensured, and parameters in the federated sub-model can be obtained by using the training method.

The federated learning method provided in an embodiment of the disclosure may be performed before training the federated model. FIG. 5 is a flowchart of a federated learning method according to an embodiment of the disclosure. As illustrated in FIG. 5, the flow includes the following operations.

At S51, an encrypted authorization request for the federated sub-model is sent to the other participating nodes.

At S52, each of the other participating nodes is verified based on a smart contract and whether to authorize the respective participating node is determined, and an authorization token is sent to the other participating nodes based on a determination result.

At S53, authorization tokens are received from the other participating nodes to complete an on-chain authorization of the federated sub-model.

The blockchain technology is introduced into the federated learning, authorization management of data of the participating nodes is realized through the blockchain smart contract, audit traceability of the training process of the federated model is realized through uploading the training parameter on chain, and audit utility of the model is realized through on-chain publication of the federated model.

Before training the federated model, it is necessary to authorize the federated sub-model and the feature corresponding to each participating node by, for example, a smart contract. Specifically, when the target participating node $N_C$ requests use to other participating nodes $N_A$ and $N_B$, the nodes $N_A$ and $N_B$ firstly verify identity of the node $N_C$, and then access legitimacy of the node $N_C$ is checked according to access constraints (such as a scope, a time limitation and the number of authorizations of the sub-model, etc.) of the smart contract, and an authorization token or a rejection message is returned. After the node $N_C$ obtains the authorization tokens from the nodes $N_A$ and $N_B$, the federated sub-model is started to be trained through the federated learning, and the gradients and parameters in the encrypted interaction process are stored in the block after on-chain consensus is reached.

Figure 8:
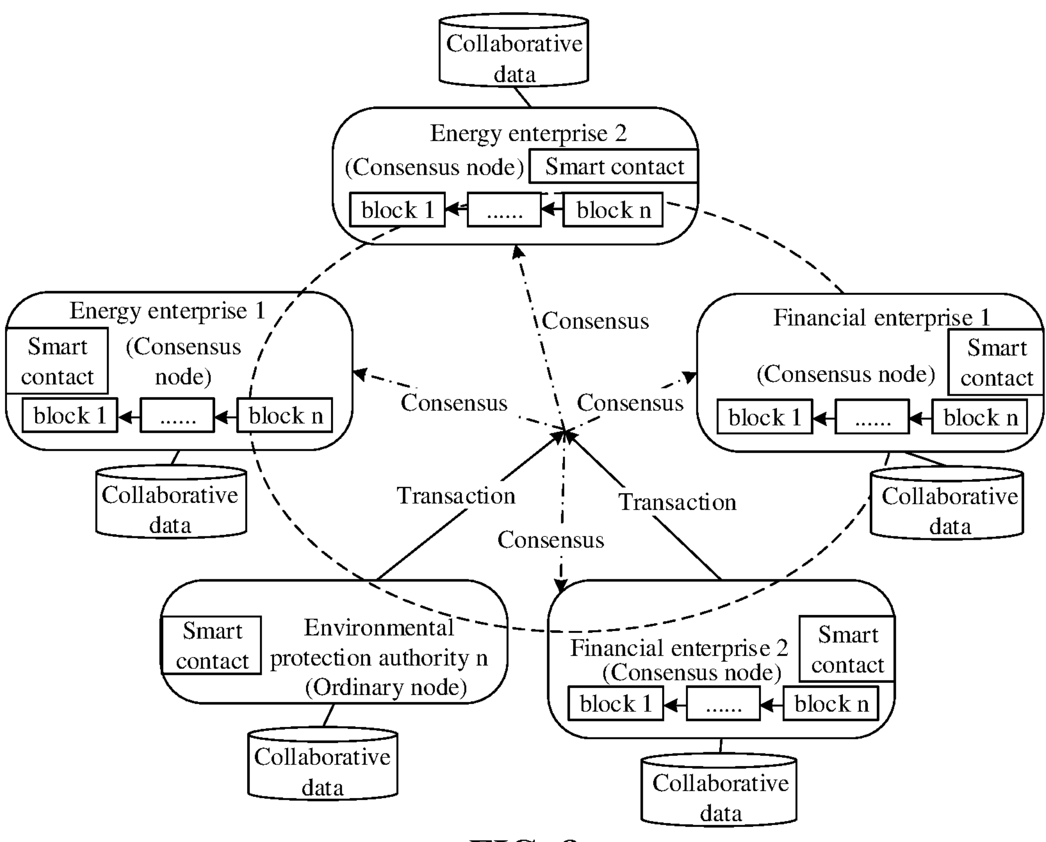
FIG. 8 is a schematic diagram of a federated system for carbon credit evaluation according to an embodiment of the present disclosure.

The federated learning method provided in the embodiments is described in detail by taking carbon credit evaluation as an example. FIG. 8 illustrates a schematic diagram of a federated system for carbon credit evaluation. With the low-carbon economy development being paid more and more attention, the purpose of saving energy and realizing sustainable development become an important part of national programs. Policies require development of low-carbon economy, advocate enterprises to conserve energy and reduce emission, and bank credit supports energy conservation and emission reduction of enterprises. Carbon credit evaluation is credit measures formulated by energy enterprises and financial enterprises for encouraging energy conservation and emission reduction and green and low-carbon development for enterprises under the national policies, to promote circular development of finance and green and low-carbon economy through low-carbon economic incentives.

The carbon credit evaluation is a green financial scenario energized by energy data. According to requirements of national green financial business, in order to evaluate carbon credit, various factors such as energy consumption, environmental protection and financial situation of enterprises may be considered to comprehensively evaluate loan applications of enterprises. Therefore, collaborative analysis of multi-party data from, for example, energy enterprises, environmental protection authorities and financial enterprises is needed in decision-making process of the carbon credit evaluation.

Figure 7:
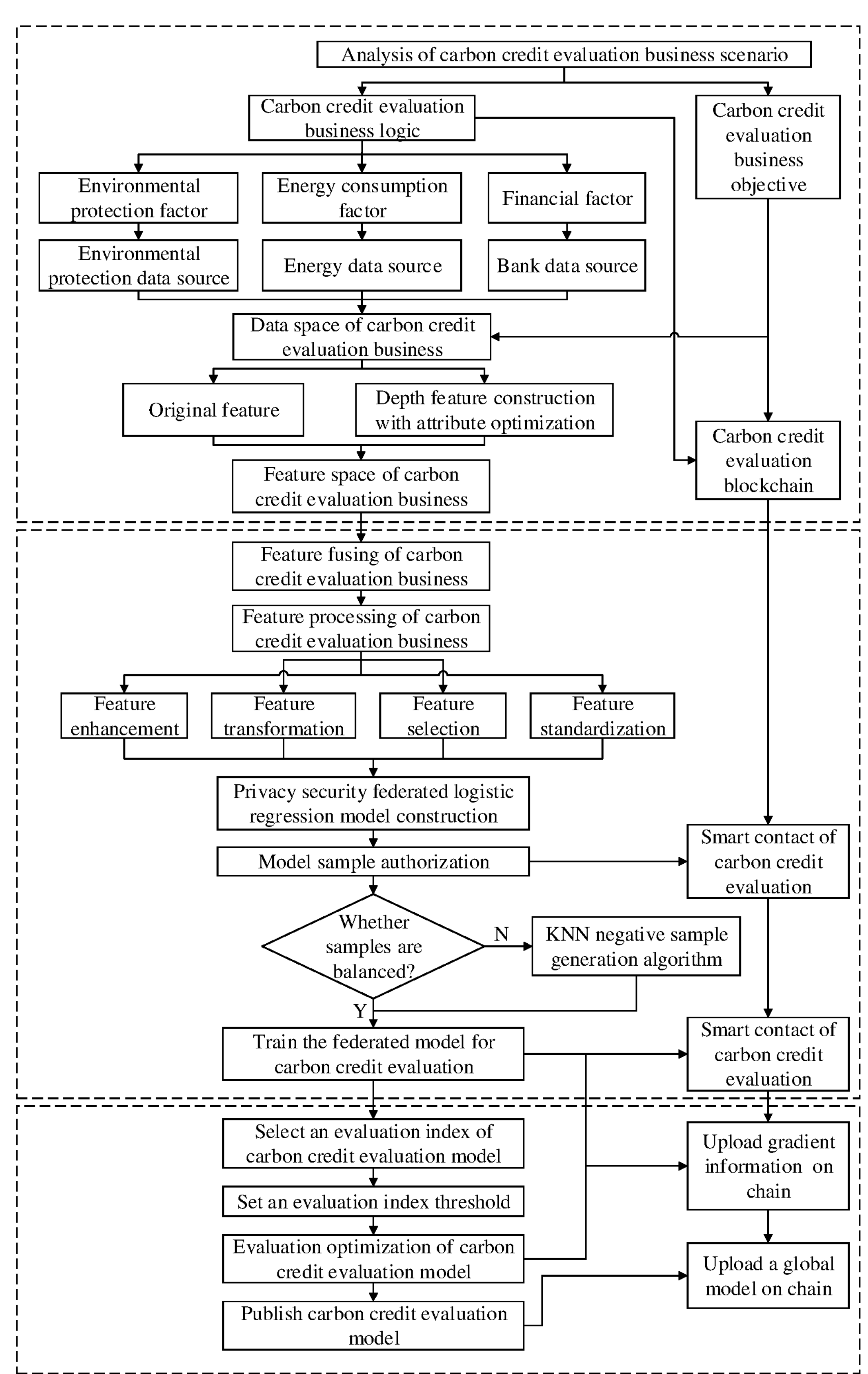
FIG. 7 shows a flowchart of a federated learning method according to an embodiment of the present disclosure.

Referring to FIGS. 6 and 7, the federated learning process based on carbon credit evaluation is described as follows.

A structure of a data space of carbon credit evaluation business is constructed. The data space is the target feature, and construction of the data space is to select, from business data, a data set with tight coupling relationship with the carbon credit evaluation by deeply analyzing business data semantics, business logic and business objective of carbon credit evaluation. The carbon credit evaluation belongs to dual-carbon (carbon neutrality and peak carbon dioxide emission) economic development business in which energy data energizes green finance and green finance promotes green energy. According to requirements of the national dual-carbon policy and green finance, the carbon credit evaluation of enterprises is measured through comprehensive evaluation of energy data, financial data and environmental protection data of the enterprises. The specific structure of the data space of the carbon credit evaluation is constructed as follows.

(1) Energy data: because objects measured by the carbon credit evaluation business are energy consumption, energy consumption production and carbon emission of enterprises, the energy data set of the carbon credit evaluation model mainly includes energy consumption data of electricity, gas, coal and oil of enterprises, gross domestic product of enterprises, carbon emission rights of enterprises and the like. The energy data set is expressed as follows:

$\text{Dataset}_{energy}$={enterprise identification, energy consumption time, comprehensive energy consumption value, energy consumption collection type, energy consumption type <electricity; natural gas; coke oven gas; blast furnace gas; raw coal; anthracite coal; gasoline; kerosene; diesel . . . >, energy consumption conversion coefficient, energy consumption value, energy consumption production value, carbon emissions, carbon emission rights}

(2) Financial data: financial measurement factors of carbon credit evaluation business are the same as those of other financial loans, mainly measuring present application data such as enterprise carbon credit evaluation quota, interest rate and period, and historical financial records such as accumulated loan amount and credit record. The financial data set is expressed as follows:

$\text{Dataset}_{finance}$ = {enterprise identification, application time, loan period, loan amount, loan interest rate, total amount of existing loans < Loan 1; Loan 2; Loan 3 … >, approval status, default records}

(3) Environmental protection data: objects measured by the carbon credit evaluation business in terms of environmental protection are the impacts of enterprises on the environment, mainly including two categories: water quality monitoring and flue gas monitoring. The water quality monitoring is mainly aimed at chemical oxygen demand (COD), ammonia nitrogen, pH value, flow rate, turbidity, etc., in large and small sewage treatment plants. The flue gas monitoring is mainly aimed at content control of sulfur dioxide, nitric oxide and oxygen in power plants and chemical plants. The carbon credit evaluation business mainly considers qualification types and qualification ratings of environmental protection of enterprises, and the environmental protection data set is expressed follows:

$\text{Dataset}_{Environment}$ = {enterprise identification, environmental impact assessment(*EIA*)qualification type < qualification 1; qualification 2 … >, *EIA* time, qualification period, *EIA* grade}

Feature space construction is a process for transforming data into features that can better represent potential problems, so as to improve the performance of machine learning. The feature space construction includes feature construction and feature processing.

A structure of a depth feature of carbon credit evaluation business is constructed. The depth feature construction mainly refers to digging deeper data features by using a depth feature generation algorithm based on data attributes of the carbon credit evaluation. In the process of depth feature digging, an attribute information entropy is calculated to measure the attribute importance degree, so as to avoid unimportant features participating in depth feature synthesis.

The information entropy is calculated by the following formula:

$$H(X)=E[p(a_1),\ p(a_2),\ \ldots,\ p(a_n)]=-\sum_{j=1}^{n}p(a_i)\log_2 p(a_i)$$

where $p(a_i)$ represents a probability of each discrete message occurred, $H_{max}(x_i)$ is $H(X)=\log_2 n$, representing a maximum information entropy.

where $0\le p(a_i)\le 1$ and $$\sum\nolimits_{j=1}^{n}p(a_i)=1.$$

According to the maximum information entropy theorem, when an information source X contains n different discrete messages, a source entropy H(X) is $H(X)\le\log_2 n$, and when and only the probabilities of each message occurring in X are all equal, $H(X)=\log_2 n$, i.e., $H_{max}(x_i)$.

The attribute importance degree is calculated by the following formula:

$$AI_i=\frac{H_{max}(x_i)-H(x_i)}{H_{max}(x_i)}$$

where $AI_i$ represents the attribute importance degree, $H_{max}(x_i)$ represents the maximum information entropy and $H(x_i)$ represents an attribute information entropy.

A value range of attribute importance degree is $AI_i\in(0,1)$, and the smaller the value is, the more important the attribute is. The greater the entropy value of the attribute is, the closer the distance between the entropy value of the attribute and the maximum discrete entropy is, then the smaller the value of the obtained importance degree is, and the more important the attribute is, otherwise, the less important the attribute is. The maximum discrete entropy is an evaluation index of the greatest uncertainty of attributes, and this kind of attribute is valuable, which indicates that this kind of attribute is extremely important. The importance degree of attribute may be determined based on the distance between attribute entropy and maximum discrete entropy. The closer the distance is, the more important the attribute is, otherwise, the less important the attribute is. A threshold of the attribute importance degree may be set, and the attributes below the threshold are identified as unimportant attributes which may be filtered out.

In the process of depth feature digging, the compound number of method used for calculating the feature is restricted, and a threshold of feature depth is set to 2, so as to avoid the problem of huge and redundant features faced by the depth feature generation algorithms. In energy data feature digging, the deep feature generation algorithm is used to obtain preferred attributes such as energy consumption variety, energy consumption value, carbon emission right and gross domestic product through attribute importance calculation, then generate a series of energy consumption features such as comprehensive energy consumption value, monthly average energy consumption value and green energy consumption ratio through aggregation operations such as grouping statistics, linear combination and data operation performed on energy consumption data in various types of energy data sheets such as electricity, natural gas, coal gas, raw coal, gasoline, diesel, etc., and deeply correlate economic data sheets of energy consuming enterprises, such as gross domestic product, to generate energy economic features such as unit energy consumption production value and green energy consumption production ratio through an aggregation operation. In financial data feature digging, each customer in a customer loan information sheet may have multiple loans involving multiple types of loan business. The deep feature generation algorithm uses one-to-many association to group observed values and then calculate statistics. In practice, the multiple loans situation of the customer is calculated by association and aggregation, and the statistics such as an average value, a maximum value and a minimum value of each customer loan are obtained.

The feature processing mainly includes operations such as feature enhancement, feature transformation, feature dimension reduction, feature selection and feature standardization. The feature enhancement realizes data consistency by performing operations such as format and content cleaning, logic error cleaning, abnormal value cleaning and missing value cleaning on data review and verification. The feature transformation includes optimization of sample distribution by implementing logarithmic transformation, exponential transformation and other operations on features by using data means, and also includes one-hot coding transformation, virtual coding transformation and effect coding transformation on discrete values. Because virtual coding has no redundancy and has interpretability, in the disclosure, virtual coding transformation is used for discrete data such as energy consumption varieties and collection types in energy consumption data and environmental credit ratings in environmental protection data. In the feature dimension reduction, a principal component analysis (PCA) algorithm is used to map a dimension of the feature from one dimension space to another. The number of features does not change, but feature values may change correspondingly in the mapping process, which can effectively solve the problems of large computation amount and long training time caused by very large feature matrix. In the feature selection, a filter method is adopted to select an optimal feature subset from the feature space in case of not reducing classification accuracy significantly and not affecting classification distribution and ensuring the feature subset stable and adaptable, so as to improve a running time of learning algorithm and increase the interpretability of the model. In the feature standardization, a standardized scaling method is used to normalize features, which reduces a huge gap between different kinds of data magnitudes such as energy consumption value, energy consumption coefficient, loan amount and loan interest rate, unifies data scales, and makes the feature value adapt to federated model which is important for an input feature scale.

According to collaborative requirements of the carbon credit evaluation, a tripartite federated model is constructed, and the logistic regression sub-model is split. The homomorphic encryption algorithm and an efficient collaborative mechanism with dynamically adjusted communication state are adopted to construct a federated logistic regression model in which energy, finance and environmental protection are collaborated efficiently and safely.

Assuming that a parameter of the federated logistic regression model is θ, and $\theta_A$, $\theta_B$ and $\theta_C$ are model parameters of an energy data center, an environmental data center and a financial data center, respectively, a general linear model, i.e., the federated model is:

$$h(x)=\theta^T x=\theta_A^T x_A+\theta_B^T x_B+\theta_C^T x_C$$

where x represents the target feature.

Logistic regression is used to map a predicted value generated by the federated model to 0 to 1 through an activation function as follows:

$$p(x)=\frac{1}{1+e^{-h(x)}}$$

Let $$u_i^A=\theta_A x_i^A,\ u_i^B=\theta_B x_i^B,\ u_i^C=\theta_C x_i^C,$$

the joint objective function is obtained as follows:

$$L=\sum_{i=1}^{N}-y_i\left(u_i^A+u_i^B+u_i^C\right)+\ln\left(1+e^{u_i^A+u_i^B+u_i^C}\right)$$

The model parameter θ may be obtained by minimizing the joint objective function.

Because the homomorphic encryption may be used to only calculate a polynomial function, thus the Taylor formula may be used to perform expansion at 0, and the joint objective function is approximately simulated as:

$$L\approx\sum_{i=1}^{N}-y_i\left(u_i^A+u_i^B+u_i^C\right)+\frac{1}{2}\left(u_i^A+u_i^B+u_i^C\right)+\frac{1}{8}\left(u_i^A+u_i^B+u_i^C\right)^2+\ln 2$$

Therefore, for the first participating node, the second participating node and the third participating node, the gradients of the local sub-model parameters are:

$$\frac{\partial L}{\partial\theta_A}=\sum_i-\frac{1}{2}y_i x_{Ai}+\frac{1}{4}u_i x_{Ai}$$

$$\frac{\partial L}{\partial\theta_B}=\sum_i-\frac{1}{2}y_i x_{Bi}+\frac{1}{4}u_i x_{Bi}$$

$$\frac{\partial L}{\partial\theta_C}=\sum_i-\frac{1}{2}y_i x_{Ci}+\frac{1}{4}u_i x_{Ci}$$

In the calculation of vertical federated learning, the training of the model is completed when the gradient information is safely calculated and a convergence value of the objective function is found. The Paillier homomorphic encryption satisfies the addition and multiplication of ciphertext, and the encrypted interaction flow of the three parties is described as follows.

(1) Each of the three parties generates a respective homomorphic encrypted public and private key pair, and sends the respective public key to the other two parties.

(2) A party A with no tag calculates $$u_i^A \text{ and } \left(u_i^A\right)^2,$$

sends $$\left[u_i^A\right]_A \text{ and } \left[\left(u_i^A\right)^2\right]_A$$

encrypted with the public key of A to C and sends $$\left[u_i^A\right]_C \text{ and } \left[\left(u_i^A\right)^2\right]_C$$

to B.

(3) The party B with no tag calculates $$u_i^B \text{ and } \left(u_i^B\right)^2,$$

sends $$\left[u_i^B\right]_A \text{ and } \left[\left(u_i^B\right)^2\right]_A$$

encrypted with the public key of A to C and sends $$\left[u_i^B\right]_C \text{ and } \left[\left(u_i^B\right)^2\right]_C$$

to A.

(4) The party C with a tag calculates $$u_i^C \text{ and } \left(u_i^C\right)^2,$$

sends $$\left[u_i^C\right]_C \text{ and } \left[\left(u_i^C\right)^2\right]_C$$

encrypted with the public key of C to A and B.

(5) The party C with the tag calculates the ciphertext objective function by using $$\left[u_i^A\right]_A,\ \left[\left(u_i^A\right)^2\right]_A,\ \left[u_i^B\right]_A \text{ and } \left[\left(u_i^B\right)^2\right]_A$$

sent by A and B, and calculates a local gradient.

where the ciphertext objective function is:

$$[L]_A=\sum_{i=1}^{N}-y_i\left(\left[u_i^A\right]+\left[u_i^B\right]+\left[u_i^C\right]\right)+\frac{1}{2}\left(\left[u_i^A\right]+\left[u_i^B\right]+\left[u_i^C\right]\right)+\frac{1}{8}\left[\left(u_i^A\right)^2\right]+\frac{1}{8}\left[\left(u_i^B\right)^2\right]+\frac{1}{8}\left[\left(u_i^C\right)^2\right]+\frac{1}{4}\left[u_i^A\times u_i^B\right]+\frac{1}{4}\left[u_i^B\times u_i^C\right]+\frac{1}{4}\left[u_i^A\times u_i^C\right]$$

and the local gradient is:

$$\left[\frac{\partial L}{\partial\theta^C}\right]_A=\sum_{i=1}^{N}-\left[y_i x_i^C\right]+\frac{1}{2}\left[x_i^C\right]+\frac{1}{4}\left[u_i^C x_i^C\right]+\frac{1}{4}\left[u_i^A x_i^C\right]+\frac{1}{4}\left[u_i^B x_i^C\right]$$

(6) The party C with the tag selects a random mask $R_C$, and sends $$\left[\frac{\partial L}{\partial\theta^C}+R_C\right]_A$$

to A.

(7) A obtains $$\frac{\partial L}{\partial\theta^C}+R_C$$

by decryption and sends it to C.

(8) C acquires $$\frac{\partial L}{\partial\theta^C}$$

and updates the local parameter.

(9) The party A with no tag calculates the ciphertext objective function by using $$\left[u_i^B\right]_C,\ \left[(u_i^B)^2\right]_C,\ \left[u_i^C\right]_C \text{ and } \left[(u_i^C)^2\right]_C$$

sent by B and C.

The ciphertext objective function is:

$$\left[\frac{\partial L}{\partial\theta^A}\right]_C=\sum_{i=1}^{N}-\left[y_i x_i^A\right]+\frac{1}{2}\left[x_i^A\right]+\frac{1}{4}\left[u_i^A x_i^A\right]+\frac{1}{4}\left[u_i^B x_i^A\right]+\frac{1}{4}\left[u_i^C x_i^A\right]$$

(10) The party A with no tag selects a random mask $R_C$, and sends $$\left[\frac{\partial L}{\partial\theta^A}+R_A\right]_C$$

to C.

(11) The party C with the tag obtains $$\frac{\partial L}{\partial\theta^A}+R_A$$

by decryption and sends it to A.

(12) A acquires $$\frac{\partial L}{\partial\theta^A}$$

and updates the local parameter.

(13) The party B with no tag calculates the ciphertext objective function by using $$\left[u_i^A\right]_C,\ \left[(u_i^A)^2\right]_C,\ \left[u_i^C\right]_C \text{ and } \left[(u_i^C)^2\right]_C$$

sent by A and C:

$$\left[\frac{\partial L}{\partial\theta^B}\right]_C=\sum_{i=1}^{N}-\left[y_i x_i^B\right]+\frac{1}{2}\left[x_i^B\right]+\frac{1}{4}\left[u_i^B x_i^B\right]+\frac{1}{4}\left[u_i^A x_i^B\right]+\frac{1}{4}\left[u_i^C x_i^B\right]$$

(14) The party B with no tag selects a random mask $R_B$, and sends $$\left[\frac{\partial L}{\partial\theta^B}+R_B\right]_C$$

to C.

(15) The party C with the tag obtains $$\frac{\partial L}{\partial\theta^B}+R_B$$

by decryption and sends it to B.

(16) B acquires $$\frac{\partial L}{\partial\theta^B}$$

and updates the local parameter.

(17) Repeat the above operations (1) to (16) until the model converges.

The formula for dynamic adjustment of the communication state is expressed as follows:

$$F_L-F_B*\left(1+\frac{T_L-T_B}{T_B}\right)$$

where $F_B$ represents the preset number of optimizations, $F_L$ represents the present number of optimizations, $T_B$ represents the preset network delay corresponding to the preset number of optimizations, and $T_L$ represents the present network delay.

The dynamic change of network delay is a fluctuating process. When the network speed is fast and the delay becomes small, a delay change $T_L-T_B$ is negative, and then the number of local optimizations of nodes decreases, that is, a frequency of gradient interaction rises accordingly. When the network speed is slow, the delay change $T_L-T_B$ is positive, and then the number of local optimizations of nodes increases, that is, the frequency of gradient interaction falls accordingly. Network communication efficiency affects a speed of model training, and gradient interaction frequency affects accuracy of model training. Dynamic adjustment of gradient interaction frequency based on network communication state can take account of both the speed and accuracy of model training in the process of model training. The number of local optimizations of federated nodes is dynamically adjusted by monitoring the network communication delay of the gradient interaction in real time, so that the efficiency of federated communication can be improved.

The number of samples corresponding to each class in the sample data set of each participating node is different from that of another participating node, and the difference may be large, that is, there is a problem of sample imbalance, which generally makes the performance of machine learning algorithms worse. In the case of unbalanced samples, an accuracy index of the model is worthless, because when the maximum accuracy, as an index, is pursed when training the model, if a small number of samples are distributed into a large number of samples by the model, only accuracy pointing to proportion of the large number of samples may be obtained. Power data and financial data have a characteristic of significant data imbalance, that is, normal data is much larger than abnormal data, and the number of negative sample state data is less. Common methods for optimizing the imbalanced samples may include sampling, weight adjustment, kernel function modification, model modification and synthetic minority over-sampling technique (SMOTE). However, the sampling method is easy to lose data information or lead to collinearity of few samples, the weight adjustment method may be hard to control appropriate weight ratio and requires multiple attempts, the kernel function modification method has high kernel function adjustment cost and is limited in application scenarios, and the model modification method has difficulty in term of finding actual laws and implementation. Therefore, the disclosure adopts SMOTE to optimize minority data sets, to avoid an over-fitting problem of the carbon credit evaluation data sets on the classification model, and efficiently alleviate the imbalance problem of the minority samples. The specific process is expressed as follows.

(1) Randomly select N minority samples to form a sample set $X_m$.

(2) Adopt a sampling nearest algorithm to calculate K nearest neighbors of each minority sample as follows:

$$X_s = \text{choose } k \text{ nearest neighbor from } D_m$$

where $X_s$ represents a neighbor sample set selected from the nearest neighbors of minority samples, $D_m$ represents a distribution of the minority samples. The kNN algorithm is used to select neighbors from the distribution $D_m$ of the minority samples.

(3) Randomly select N samples from K nearest neighbors for random linear interpolation, to construct new minority samples as follows:

$$X_c = X_s + (X_m - X_s) * \text{random}_{step}$$

where $\text{random}_{step}$ is a parameter specified by a user, and $\text{random}_{step} \in (0, 1)$.

(4) Put the synthesized new samples into an original minority sample set to form a new minority sample set as follows:

$$X'_m = X_m + X_c$$

With the SMOTE, a difference between an eigenvector of a minority sample and its nearest neighbor is determined, the difference is multiplied by a random number between 0 and 1, and the multiplication result is added to the eigenvector. Geometrically, the algorithm selects a random point along a straight line between two specific sample features. This method of randomly selecting minority sample points enables a decision-making area of minority samples more generalized. The specific operation is to randomly select a new minority sample $X_c$ from the connection line, in a high-dimensional space, between a minority sample and its neighbor, and then put $X_c$ into the previous minority sample set $X_m$, to get a minority sample data set close to an equilibrium state.

After obtaining the federated model, it is necessary to evaluate the model. In the process of model evaluation, because each index may only reflect one aspect of the characteristics of the model, a specific index may be used for different models to be evaluated in different application scenarios. Reasonable use of a combination of evaluation indexes can realize accurate analysis of business scenarios by the model. Common model evaluation indexes include accuracy, precision, a true positive rate (TPR) (i.e., Recall), a false positive rate (FPR), a precision-recall (P-R) curve, an F1-Score, a receiver operating characteristic (ROC) curve and so on. The accuracy may reflect the classification accuracy of the model in general, but it is impossible to distinguish specific recognitions of positive and negative samples in detail. The precision and TPR (recall) reflect details of positive sample recognition, while FPR reflects details of negative sample recognition. Among the above indexes, the accuracy and TPR (recall) are a pair of contradictory and unified indexes. In order to improve the accuracy, the model identifies positive samples when it is quite sure, but at this situation, many positive samples may be omitted because of conservatism, and the TPR (recall) may be reduced. The P-R curve and F1-Score are indexes that comprehensively reflect prediction performance of the model by balancing the accuracy and TPR (recall). ROC curve is an index to reflect the performance of the model by comprehensively considering the TPR (recall) and FPR.

In the carbon credit evaluation business, financial risk control is one of important core objectives of the business, and risk control is closely related to safety of financial enterprises. Because it is much more expensive to classify negative samples as positive samples than classifying positive samples as negative samples by classification models in fields of electricity, finance and medicine. Therefore, the risk control is an important evaluation factor in the carbon credit evaluation prediction model. The key to risk control of carbon credit evaluation is strict examination of user qualifications, to prevent approval of unqualified users, which corresponds to the FPR index in evaluation of the carbon credit evaluation prediction model. Therefore, the disclosure takes the FPR as an important index for evaluation of the performance of the model. In addition to the risk control, another important evaluation factor of carbon credit evaluation prediction model is digging user who conform to carbon credit evaluation, which corresponds to the TPR (recall) in evaluation of carbon credit evaluation prediction model. Therefore, the disclosure takes the TPR (recall) index as an important index for evaluation of the performance of the model, and the ROC curve which comprehensively reflects the TPR (recall) and FPR index is also used as an index for evaluation of the performance of the model. In addition, in consideration of multi-dimensional comprehensive evaluation of the performance of the model, the accuracy and precision are used as auxiliary evaluation indexes of the carbon credit evaluation prediction model, and the F1-Score is selected as an auxiliary evaluation index of the model considering that the P-R curve may drastically change with changes of the positive and negative samples.

For the carbon credit evaluation business, business meanings and calculation formula of the above evaluation indexes are expressed as follows:

(1) The FPR means a proportion of mistakenly approved users in users actually ineligible for the carbon credit evaluation, the FPR reflects a degree of false approval, and the calculation formula is expressed as follows:

$$FPR = \frac{FP}{FP + TN}$$

(2) The TPR (recall) means a proportion of correctly approved users in users actually eligible for the carbon credit evaluation, the TPR (recall) reflects an identification ability for the users actually eligible for the carbon credit evaluation, and the calculation formula is expressed as follows:

$$TPR(\text{Recall}) = \frac{TP}{TP + FN}$$

(3) The accuracy means a proportion of correctly approved users in all users applying for the carbon credit evaluation, and the calculation formula is expressed as follows:

$$\text{Accuracy} = \frac{TP + TN}{TP + TN + FP + FN}$$

(4) The precision means a proportion of users actually eligible for the carbon credit evaluation in approved users, and the calculation formula is expressed as follows:

$$\text{Precision} = \frac{TP}{TP + FP}$$

(5) The F1-Score is a harmonic average of the precision and TPR (recall), and the calculation formula is expressed as follows:

$$F_1 = 2 * \frac{\text{Precision} * \text{Recall}}{\text{Precision} + \text{Recall}}$$

In the above formulas, true positive (TP) represents the number of samples that are actually positive and also determined by a classifier as positive; false positive (FP) represents the number of samples that are actually negative but determined by the classifier as positive; false negative (FN) represents the number of samples that are actually positive but determined by the classifier as negative; and true negative (TN) represents the number of samples that are actually negative and also determined by the classifier as negative.

In the process of model optimization, the model may be optimized and reconstructed by means of algorithm parameter adjustment, feature combination and iterative updating. Model parameter optimization aims to find parameters for the machine learning algorithm to have best performance on authentication data set, and setting of parameters has a direct impact on the model performance. According to business characteristics of the carbon credit evaluation and prediction model, selection of the effectiveness evaluation and optimization method and using model evaluation results for model optimization and reconstruction can continuously improve the accuracy of the model.

With regard to parameter adjusting and optimizing, a manual trial-and-error method for manually adjust and optimize hyper-parameters and experience determination of how to set the hyper-parameters to obtain higher model accuracy rely on a lot of experience and are very time-consuming. At present, the common methods for automatic optimization of hyper-parameter include grid search, random search, Bayesian optimization, gradient-based optimization and evolutionary optimization. Because Bayesian optimization method may limit the number of calculations for the model training evaluation; the gradient-based optimization method has a disadvantage of non-convex property; the evolutionary algorithm is generally used for finding an approximate solution that are difficult to be solved by other technologies due to its time-consuming and high occupancy of computing resources, at present, the network search and random search are widely used. In view of rapidity of random search, the federated model for carbon credit evaluation business in the disclosure adopts the random search method in which the model is trained by selecting random combinations on the basis of hyper-parameter grid through random search. The random search can control the number of combinations, select appropriate number of calculations based on time and calculation resources, and thus can determine the best value of certain important hyper-parameters fast and accurately.

The federated model for carbon credit evaluation business belongs to the vertical federated learning. The data sample spaces of the energy data center, financial data center and environmental protection data center overlap greatly, but the feature spaces of them are different. Therefore, the model may be trained by using all the features of the same samples in each data party, that is, different dimensional features such as the energy data, financial data and environmental protection data of the same user may be used for joint training. In this case, each data party has a model in which part of sample data are related to its own feature space, thus the training and prediction service of the model may be completed only by online authorization of all parties in time. To solve this problem, access control policy may be set in a time dimension and a space dimension by constricting access of each federated sub-model through the smart contract. The automatic and reliable access control for node resources can be achieved by the smart contract without artificial participation of security administrators. The access control is performed based on policies issued by resource owners, and the decision process is public and transparent.

In the model training process, malicious nodes may upload false parameters or low-quality models, which may affect the aggregation process and model quality. The disclosure adopts blockchain to record intermediate parameters in the model training process as audit traceability evidence, encourages cooperative nodes to verify model parameters, and punishes participating nodes that upload false parameters or low-quality models, so as to constrain node self-interest and improve the quality of model aggregation.

After training of the federated model is completed, the model owned by each node itself may correspond to many model users, i.e., model customers, and it is necessary to solve the access control problem between the model and users. The disclosure realizes the publication and access control of the model through the smart contract, realizes on-chain audit used by the model while completing the publication and use of the model, and supports paid redemption business of right of use of the model based on model usage record.

There are two main ways for controlling the right for accessing node samples and sub-models through the smart contract, namely, time dimension based access right control and space dimension based access right control. The time dimension based access right control means that a life cycle of a resource is constrained by the smart contract, and an accessible time interval of the resource is specified in the smart contract. Data resources in the time interval are opening up to public, and data resources outside the time interval are not opening up to public. The timeliness of data resources can be effectively guaranteed by deploying events triggered based on time in the smart contract. The space dimension based access right control means that a scope accessible by the user is restricted in the smart contract. When the smart contract receives a query message signed with private key, the smart contract verifies whether the sample or sub-model object being accessed is within the access space scope, and returns an access token or rejection information based on the verification result.

A scenario of implementing authorization of a node sample and sub-model of the carbon credit evaluation by using the smart contract mainly includes the following processes. When the target participating node $N_C$ requests use to participating nodes $N_A$ and $N_B$, the nodes $N_A$ and $N_B$ firstly verifies identity of the node $N_B$, and then the smart contract verifies access legitimacy of the node $N_C$ according to access constraints (such as a scope, a time limitation and the number of authorizations of the sample or sub-model, etc.), and an authorization token or a rejection message is returned. After the node $N_C$ obtains the authorization tokens from the nodes $N_A$ and $N_B$, it launches security collaborative training with the nodes $N_A$ and $N_B$ through the federated learning platform, and gradient information and parameter information in the collaborative process are stored in the block after on-chain consensus is reached. After the training is completed, the node $N_C$ publishes a model invoking interface to publish model application programming interface (API) information on chain through the smart contract.

The specific implementation process is expressed as follows.

(1) Collaborative sample/sub-model request. The node $N_C$ sends a request for authorization of using an encrypted and signed node sample or sub-model to the access control smart contract of the nodes $N_A$ and $N_B$, the request contains information such as a purpose for accessing the resource, a time for accessing the resource and the number for accessing the resource.

$$N_C \to N_A : Req = E_{PK_{NA}}(\text{Request}\|\text{Signature}_{N_C}\|\text{timestamp})$$

-continued $$N_C \to N_B : Req = E_{PK_{NB}}(\text{Request}\|\text{Signature}_{N_C}\|\text{timestamp})$$

(2) Smart contract authorization. After verifying the identity of the node $N_B$, the smart contract verifies the access constraints for the node $N_B$ to determine whether to authorize the access, and sends these constraints and tokens T corresponding to the accessed resources to $N_B$.

$$N_A \to N_C : \text{Message} = E_{PK_{NC}}(\text{Constraints}\|\text{Toke}_{AC}\|\text{Signature}_{N_A}\ \|\ \text{timestamp})$$

$$N_B \to N_C : \text{Message} = E_{PK_{NC}}(\text{Constraints}\|\text{Toke}_{BC}\|\text{Signature}_{N_B}\|\text{timestamp})$$

(3) Collaborative sample training/sub-model prediction. After the node $N_C$ receives the authorization tokens $\text{Toke}_{AC}$ and $\text{Toke}_{BC}$, the node starts to train and predict the carbon credit evaluation model through various node samples and sub-models by using the federated learning platform.

(4) Upload collaborative process on chain. The gradient information interacted in each round of calculation process of the federated learning is stored in a block after passing the consensus of the consensus nodes on chain. When the block is uploaded on chain, a hash value of the current block is obtained by calculating data content of the block. The method for calculating the hash value is expressed as follows:

$$\text{Hash} = SHA256(\text{lasthash, timestamp, transactions})$$

For easy storage, all transactions in the block are organized into a Merkel tree, and the hash value of the Merkel tree root is stored in the header of the block. The block generator signs the hash value of the current block with its own private key, so as to prevent the block from being tampered in the process of network propagation. The node receiving the new block may authenticate the generation of the block generator and whether the hash value of the block is tampered by using the signature.

(5) Publish a global model on chain. After the model training is completed, the input parameter and output parameters of the model are published on chain in the form of API interface through the smart contract, and a right policy is set to control access of API users.

The API request information format is expressed as follows:

$$Req = E_{PK_{REq}}(API\ \ url \,\|\, \text{Datainput}(\text{data}_1, \ldots\ \text{data}_n)\|\text{Signature}_{REq}\|\text{timestamp})$$

The blockchain technology is introduced into the collaboration framework of the federated learning, authorization management of samples of the collaborative participating nodes is realized through the blockchain smart contract, audit traceability of the training process of the carbon credit evaluation model is realized through upload of the training parameter on chain, and audit utility of the carbon credit evaluation model is realized through publishing the federated global model on chain.

Figure 9:
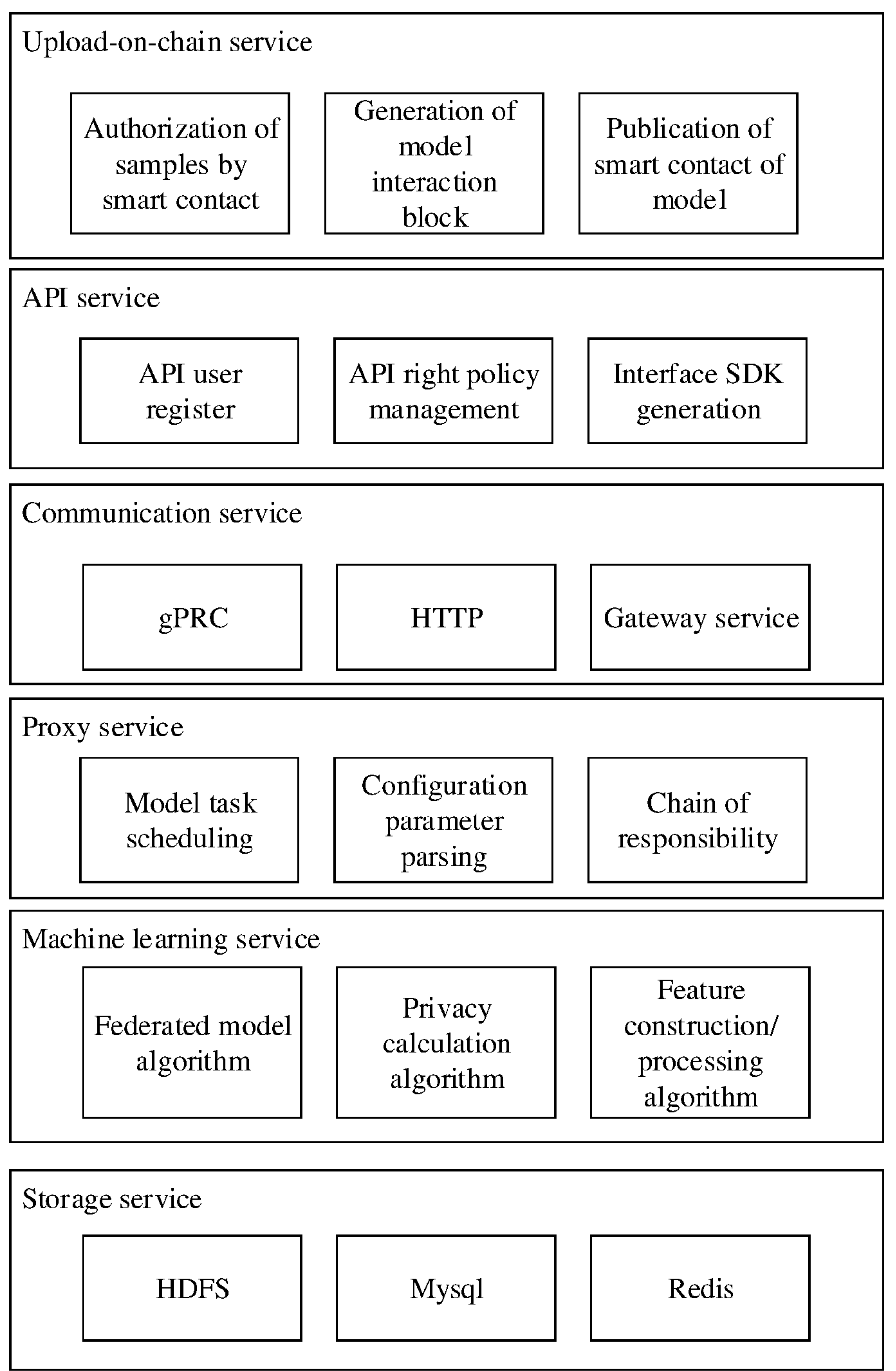
FIG. 9 is a schematic structure diagram of a federated device for carbon credit evaluation according to an embodiment of the present disclosure.

FIG. 9 illustrates a schematic structure diagram of a federated platform device based on carbon credit evaluation. The device includes: at least one communication service component configured to communicate the federated learning remotely and interact a protocol; at least one proxy component configured to distribute tasks for access operation to local users; at least one modeling workbench configured to visualize functions such as multi-party security computation and federated learning; at least one machine learning service component configured to provide multiple multi-party security computation and federated learning algorithms; at least one API service component configured for the multi-party security computation and federated learning model publishing to provide instant data service for users; at least one storage service component configured to store model parameters and process data of the multi-party security computation and federated learning; and at least one upload-on-chain service component configured to publish the local sample/sub-model authorization policy and the global model on chain.

The communication service component includes Google remote procedure call (gRPC), hypertext transfer protocol (HTTP) and gateway service. In order to expose service information to others as little as possible and call the training service conveniently, the gateway service needs to be introduced to realize service routing, and gRPC interface and HTTP interface are exposed to public. All requests from external systems may be delegated to the gateway service for request forwarding. The agent component may be implemented by Nginx, which is responsible for scheduling user tasks, parsing configuration parameters and scheduling the whole training task. The component may transform a training task into a chain of responsibility according to the specified component running sequence by using the chain of responsibility mode in design patterns, and submit the chain of responsibility to the task thread pool for execution. The modeling workbench may flexibly call and assemble modeling components and design a modeling process through the visual interface. The API service components may publish API calling interfaces through a software development kit (SDK), and an external system may obtain interface addresses through service to call and carry out prediction tasks. The storage service component may be implemented as HDFS, Mysql, Redis and other ways. Each predicted result is stored to meet the business requirements, and the model may also be stored, thus the model may not be loaded from the distributed storage system every time a reasoning request is initiated, thus ensuring security and improving efficiency.

The solution constructs the data space for carbon credit evaluation by combining the green financial policy requirements and the carbon credit evaluation business logic, thereby realizing accurate positioning of the decision-making elements of carbon credit evaluation business. The importance degree of the attribute is measured by calculating the attribute information entropy in the process of depth feature digging, the depth feature construction method with attribute optimization is adopted to prevent unimportant features from participating in depth feature synthesis, and avoid the problem of huge and redundant features faced by the depth feature generation algorithms. *A* federated logistic regression model based on tripartite cooperation is designed. The homomorphic encryption privacy mechanism is introduced in the model interaction process, and the fact that no sensitive information of others can be obtained can be ensured by using addition and multiplication of homomorphic encryption. Meanwhile, the strategy method of dynamically adjusting the number of iterations of nodes based on the change of communication state is constructed, and the increase or decrease of interaction frequency is controlled by the number of iterations of the nodes, thus efficiency of training the model can be improved. The optimal prediction of carbon credit evaluation can be realized by selecting the best evaluation index in consideration of the characteristics of risk control requirements of the carbon credit evaluation and setting the index threshold that meets the business requirements. An on-chain smart contract authorization mechanism of the node sample/sub-model is designed, thus automatic and reliable access control of node resources can be realized based on published policies. The storage and verification technology of model interactive process is adopted, and the blockchain is used to record the intermediate parameters of the model training process as audit traceability evidence, which can constrain the self-interest of nodes and improve the quality of model aggregation. Model publishing and access control by the smart contract can realize on-chain use and audit of model use, and can also support paid use business of model launched based on model use records.

Referring to FIG. 10, FIG. 10 is a schematic structure diagram of an electronic device provided by an optional embodiment of the present disclosure. As illustrated in FIG. 10, the electronic device may include at least one processor 601, such as a central processing unit (CPU), at least one communication interface 603, a memory 604, and at least one communication bus 602. The communication bus 602 is for implementing connection and communication between these components. The communication interface 603 may include a display and a keyboard, and optionally, the communication interface 603 may also include a standard wired interface and a wireless interface. The memory 604 may be a high-speed random access memory (RAM), i.e., a volatile RAM or a non-volatile memory such as at least one disk memory. Optionally, the memory 604 may also be at least one storage device located remotely from the aforementioned processor 601. The processor 601 may be understood with the device described in FIG. 9, an application program is stored in the memory 604 and the processor 601 invokes the program code stored in the memory 604 to perform any of the above method steps.

The communication bus 602 may be a peripheral component interconnect (PCI) bus or an extended industry standard architecture (EISA) bus or the like. The communication bus 602 may be classified as an address bus, a data bus, a control bus and the like. For ease of presentation, the communication bus is represented by a single thick line in FIG. 10, but it does not mean that there is only one bus or one type of bus.

The memory 604 may include a volatile memory such as an RAM. The memory may also include a non-volatile memory such as a flash memory, a hard disk drive (HDD) or a solid-state drive (SSD). The memory 604 may also include a combination of the above-mentioned memories.

The processor 601 may be a CPU, a network processor (NP), or a combination of the CPU and NP.

The processor 601 may further include a hardware chip. The hardware chip may be an application-specific integrated circuit (ASIC), a programmable logic device (PLD) or a combination thereof. The PLD may be a complex programmable logic device (CPLD), a field-programmable gate array (FPGA), a generic array logic (GAL) or any combination thereof.

Alternatively, the memory 604 is also used to store program instructions. The processor 601 may invoke the program instructions to implement the federated learning method for carbon credit evaluation as illustrated in embodiments of the present disclosure.

Embodiments of the present disclosure also provide a non-transient computer storage medium having stored computer executable instructions thereon that, when being executed, may perform the security joint calculation method for energy consumption data in any of the above method embodiments. The storage medium may be a magnetic disk, an optical disk, a read-only memory (ROM), an RAM, a flash memory, an HDD or an SSD, etc. The storage medium may also include a combination of the above memories.

Those skilled in the art will appreciate that embodiments of the present disclosure may be provided as methods, systems or computer program products. Accordingly, the disclosure may take the form of an entirely hardware embodiment, an entirely software embodiment or an embodiment combining software and hardware aspects. Further, the disclosure may take the form of a computer program product implemented on one or more computer-usable storage media (including but not limited to a disk storage, a CD-ROM, an optical memory, etc.) containing computer-executable program code therein.

The present disclosure is described herein with reference to flowcharts and/or block diagrams of methods, devices (systems), and computer program products in accordance with embodiments of the present disclosure. It is understood that the computer program instructions may implement each flow and/or block in the flowcharts and/or the block diagrams, and combinations of flows and/or blocks in the flow charts and/or block diagrams.

These computer program instructions may be provided to a processor of a general purpose computer, a special purpose computer, an embedded processor or other programmable data processing devices, to generate a machine which enable the instructions executed by the processor of a computer or other programmable data processing devices to generate an apparatus for performing functions specified in one or more flows in the flow charts and/or one or more blocks in the block diagrams.

These computer program instructions may also be stored in a computer-readable memory which can direct a computer or other programmable data processing devices to operate in a specific manner, to enable the instructions stored in the computer-readable memory to generate a manufacture including instruction apparatus for performing functions specified in one or more flows in the flow charts and/or one or more blocks in the block diagrams.

These computer program instructions may also be loaded onto a computer or other programmable data processing devices, such that a series of operational steps are executed on the computer or other programmable devices to generate computer-implemented processes. Therefore, the instructions executed on the computer or other programmable devices provide steps for implementing the functions specified in one or more flows in the flow charts and/or one or more blocks in the block diagrams.

Finally, it should be noted that the above embodiments are intended only to illustrate the technical solution of the present disclosure and not to limit the technical solution. Although the present disclosure is described in detail with reference to the above embodiments, it should be understood by those of ordinary skill in the art that modifications or equivalents may be made to the specific embodiments of the present disclosure, and any modification or equivalent not departing from the spirit and scope of the present disclosure should be covered within the scope of protection of the claims of the present disclosure.

INDUSTRIAL APPLICABILITY

The application discloses a federated learning method for carbon credit evaluation, a system, an electronic device and a computer readable storage medium. The method includes: obtaining a target federated sub-model of a target participating node, the target federated sub-model being obtained by splitting a federated model including at least three federated sub-models, and the target federated sub-model including a model parameter and a target feature of the target participating node; obtaining a present network delay and a preset number of optimizations of the target feature; determining a present number of optimizations based on a difference between the present network delay and a preset network delay corresponding to the preset number of optimizations; performing local optimization on the target feature according to the present number of optimizations; and performing encrypted interaction on an optimization result of the target feature with other participating nodes, to optimize the model parameter to determine a target model parameter of the target federated sub-model. The technical solution can improve the security of the multi-party data interaction.

The invention claimed is:

1. A federated learning method for carbon credit evaluation, performed by an electronic device of a target participating node, the method comprising:

obtaining a target federated sub-model of the target participating node, wherein the target federated sub-model is obtained by splitting a federated model comprising at least three federated sub-models, and the target federated sub-model comprises a model parameter and a target feature of the target participating node;

obtaining a present network delay and a preset number of optimizations of the target feature;

determining a present number of optimizations based on a difference between the present network delay and a preset network delay corresponding to the preset number of optimizations, wherein the present number of optimizations is calculated by the following formula:

$$F_L = F_B * \left(1 + \frac{T_L - T_B}{T_B}\right)$$

where $F_B$ represents the preset number of optimizations, $F_L$ represents the present number of optimizations, $T_B$ represents the preset network delay corresponding to the preset number of optimizations, and $T_L$ represents the present network delay;

locally optimizing the target feature based on the present number of optimizations to obtain an optimization result of the target feature; and performing encrypted interaction on the optimization result of the target feature with electronic devices of other participating nodes, to optimize the model parameter to determine a target model parameter of the target federated sub-model, wherein performing the encrypted interaction on the optimization result of the target feature with the electronic devices of the other participating nodes comprises:

calculating a public key and a private key based on a homomorphic encryption algorithm, and sending the public key to the electronic devices of the other participating nodes;

calculating a product of the optimization result of the target feature and the model parameter corresponding to the target federated sub-model and a square of the product of the optimization result of the target feature and the model parameter, and sending the product and the square of the product to the electronic devices of the other participating nodes; and sending a ciphertext gradient encrypted with a public key of a specified participating node to the electronic devices of all other participating nodes, the method further comprising: before sending the ciphertext gradient encrypted with the public key of the specified participating node to the electronic devices of all other participating nodes, receiving a product of a model parameter and a respective target feature and the square of the product of the model parameter and the respective target feature encrypted by each of the electronic devices of the other participating nodes with the public key of the specified participating node;

determining a ciphertext objective function based on the received product and square of the product sent by each of the electronic devices of the other participating nodes; and calculating the ciphertext gradient of the target participating node based on the ciphertext objective function, wherein the ciphertext gradient is encrypted with the public key of the specified participating node, and the ciphertext objective function is calculated by the following formula:

$$[L] = \sum_{i=1}^{N} -y_i([u_i^A] + [u_i^B] + [u_i^C]) + \frac{1}{2}([u_i^A] + [u_i^B] + [u_i^C]) + \frac{1}{8}[(u_i^A)^2] + \frac{1}{8}[(u_i^B)^2] + \frac{1}{8}[(u_i^C)^2] + \frac{1}{4}[u_i^A \times u_i^B] + \frac{1}{4}[u_i^B \times u_i^C] + \frac{1}{4}[u_i^A \times u_i^C]$$

and the ciphertext gradient of the target participating node is:

$$\left[\frac{\partial L}{\partial \theta^C}\right]_A = \sum_{i=1}^{N} -[y_i x_i^C] + \frac{1}{2}[x_i^C] + \frac{1}{4}[u_i^C x_i^C] + \frac{1}{4}[u_i^A x_i^C] + \frac{1}{4}[u_i^B x_i^C]$$

where L represents the ciphertext objective function, $y_i$ represents a global model prediction value, θ represents a model parameter of a federated sub-model corresponding to a participating node, $x_i$ represents a target feature corresponding to a participating node, $$u_i^A = \theta_A x_i^A,\ u_i^B = \theta_B x_i^B,\ u_i^C = \theta_C x_i^C,$$

$\theta^C$ represents the model parameter of the target federated sub-model, $$x_i^C$$

represents the target feature of the target participating node, and $$\left[\frac{\partial L}{\partial \theta^C}\right]_A$$

represents the ciphertext gradient encrypted with the public key of the specified participating node, and the method further comprising: after sending the ciphertext gradient encrypted with the public key of the specified participating node to the electronic devices of all other participating nodes, receiving a gradient result obtained by each of the electronic devices of the other participating nodes decrypting the ciphertext gradient of the target participating node, to determine the target model parameter of the target federated sub-model.

2. The method of claim 1, further comprising: before obtaining the target federated sub-model of the target participating node, extracting a data feature from a data set as an original data feature;

calculating an information entropy of the data feature, and calculating an attribute importance degree of the data feature based on the information entropy, to optimize the data feature and obtain a data depth feature; and fusing the original data feature and the data depth feature to obtain the target feature of the target participating node.

3. The method of claim 2, wherein the information entropy is calculated by the following formula:

$$H(X) = E[p(a_1), p(a_2), \ldots, p(a_n)] = -\sum_{j=1}^{n} p(a_i)\log_2 p(a_i)$$

where $p(a_i)$ represents a probability of each discrete message occurred, $H_{max}(x_i)$ is $H(X)=\log_2 n$, representing a maximum information entropy; and the attribute importance degree is calculated by the following formula:

$$AI_i = \frac{H_{max}(x_i) - H(x_i)}{H_{max}(x_i)}$$

where $AI_i$ represents the attribute importance degree, $H_{max}(x_i)$ represents the maximum information entropy and $H(x_i)$ represents an attribute information entropy.

4. The method of claim 1, further comprising:

sending an encrypted authorization request for the federated sub-model to the electronic devices of the other participating nodes;

verifying each of the other participating nodes based on a smart contract and determining whether to authorize the respective participating node, and sending an authorization token to the electronic devices of the other participating nodes based on a determination result; and receiving authorization tokens from the electronic devices of the other participating nodes to complete an on-chain authorization of the federated sub-model.

5. An electronic device, comprising a memory for storing computer instructions; and a processor, wherein the memory is communicatively connected to the processor; and the processor is configured to execute the computer instructions to perform the following operations:

obtaining a target federated sub-model of a target participating node, wherein the target federated sub-model is obtained by splitting a federated model comprising at least three federated sub-models, and the target federated sub-model comprises a model parameter and a target feature of the target participating node;

obtaining a present network delay and a preset number of optimizations of the target feature;

determining a present number of optimizations based on a difference between the present network delay and a preset network delay corresponding to the preset number of optimizations, wherein the present number of optimizations is calculated by the following formula:

$$F_L = F_B * \left(1 + \frac{T_L - T_B}{T_B}\right)$$

where $F_B$ represents the preset number of optimizations, $F_L$ represents the present number of optimizations, $T_B$ represents the preset network delay corresponding to the preset number of optimizations, and $T_L$ represents the present network delay;

locally optimizing the target feature based on the present number of optimizations to obtain an optimization result of the target feature; and performing encrypted interaction on the optimization result of the target feature with electronic devices of other participating nodes, to optimize the model parameter to determine a target model parameter of the target federated sub-model, wherein the processor is further configured to:

calculate a public key and a private key based on a homomorphic encryption algorithm, and send the public key to the electronic devices of the other participating nodes;

calculate a product of the optimization result of the target feature and the model parameter corresponding to the target federated sub-model and a square of the product of the optimization result of the target feature and the model parameter, and send the product and the square of the product to the electronic devices of the other participating nodes; and send a ciphertext gradient encrypted with a public key of a specified participating node to the electronic devices of all other participating nodes, wherein the processor is further configured to: before sending the ciphertext gradient encrypted with the public key of the specified participating node to the electronic devices of all other participating nodes, receive a product of a model parameter and a respective target feature and the square of the product of the model parameter and the respective target feature encrypted by each of the electronic devices of the other participating nodes with the public key of the specified participating node;

determine a ciphertext objective function based on the received product and square of the product sent by each of the electronic devices of the other participating nodes; and calculate the ciphertext gradient of the target participating node based on the ciphertext objective function, wherein the ciphertext gradient is encrypted with the public key of the specified participating node, and the ciphertext objective function is calculated by the following formula:

$$[L] = \sum_{i=1}^{N} -y_i([u_i^A] + [u_i^B] + [u_i^C]) + \frac{1}{2}([u_i^A] + [u_i^B] + [u_i^C]) + \frac{1}{8}[(u_i^A)^2] + \frac{1}{8}[(u_i^B)^2] + \frac{1}{8}[(u_i^C)^2] + \frac{1}{4}[u_i^A \times u_i^B] + \frac{1}{4}[u_i^B \times u_i^C] + \frac{1}{4}[u_i^A \times u_i^C]$$

and the ciphertext gradient of the target participating node is:

$$\left[\frac{\partial L}{\partial \theta^C}\right]_A = \sum_{i=1}^{N} -[y_i x_i^C] + \frac{1}{2}[x_i^C] + \frac{1}{4}[u_i^C x_i^C] + \frac{1}{4}[u_i^A x_i^C] + \frac{1}{4}[u_i^B x_i^C]$$

where L represents the ciphertext objective function, $y_i$ represents a global model prediction value, θ represents a model parameter of a federated sub-model corresponding to a participating node, $x_i$ represents a target feature corresponding to a participating node, $$u_i^A = \theta_A x_i^A,\ u_i^B = \theta_B x_i^B,\ u_i^C = \theta_C x_i^C,$$

$\theta^C$ represents the model parameter of the target federated sub-model, $$x_i^C$$

represents the target feature of the target participating node, and $$\left[\frac{\partial L}{\partial \theta^C}\right]_A$$

represents the ciphertext gradient encrypted with the public key of the specified participating node, wherein the processor is further configured to: after sending the ciphertext gradient encrypted with the public key of the specified participating node to the electronic devices of all other participating nodes, receive a gradient result obtained by each of the electronic devices of the other participating nodes decrypting the ciphertext gradient of the target participating node, to determine the target model parameter of the target federated sub-model.

6. A non-transitory computer-readable storage medium, wherein the non-transitory computer-readable storage medium has stored thereon computer instructions which, when being executed by a computer, cause the computer to perform the following operations:

obtaining a target federated sub-model of a target participating node, wherein the target federated sub-model is obtained by splitting a federated model comprising at least three federated sub-models, and the target federated sub-model comprises a model parameter and a target feature of the target participating node;

obtaining a present network delay and a preset number of optimizations of the target feature;

determining a present number of optimizations based on a difference between the present network delay and a preset network delay corresponding to the preset number of optimizations, wherein the present number of optimizations is calculated by the following formula:

$$F_L = F_B * \left(1 + \frac{T_L - T_B}{T_B}\right)$$

where $F_B$ represents the preset number of optimizations, $F_L$ represents the present number of optimizations, $T_B$ represents the preset network delay corresponding to the preset number of optimizations, and $T_L$ represents the present network delay;

locally optimizing the target feature based on the present number of optimizations to obtain an optimization result of the target feature; and performing encrypted interaction on the optimization result of the target feature with electronic devices of other participating nodes, to optimize the model parameter to determine a target model parameter of the target federated sub-model, wherein the computer instructions which, when being executed by the computer, causes the computer to:

calculate a public key and a private key based on a homomorphic encryption algorithm, and send the public key to the electronic devices of the other participating nodes;

calculate a product of the optimization result of the target feature and the model parameter corresponding to the target federated sub-model and a square of the product of the optimization result of the target feature and the model parameter, and send the product and the square of the product to the electronic devices of the other participating nodes; and send a ciphertext gradient encrypted with a public key of a specified participating node to the electronic devices of all other participating nodes, wherein the computer instructions which, when being executed by the computer, causes the computer to: before sending the ciphertext gradient encrypted with the public key of the specified participating node to the electronic devices of all other participating nodes, receive a product of a model parameter and a respective target feature and the square of the product of the model parameter and the respective target feature encrypted by each of the electronic devices of the other participating nodes with the public key of the specified participating node;

determine a ciphertext objective function based on the received product and square of the product sent by each of the electronic devices of the other participating nodes; and calculate the ciphertext gradient of the target participating node based on the ciphertext objective function, wherein the ciphertext gradient is encrypted with the public key of the specified participating node, and the ciphertext objective function is calculated by the following formula:

$$[L] = \sum_{i=1}^{N} -y_i([u_i^A] + [u_i^B] + [u_i^C]) + \frac{1}{2}([u_i^A] + [u_i^B] + [u_i^C]) + \frac{1}{8}[(u_i^A)^2] + \frac{1}{8}[(u_i^B)^2] + \frac{1}{8}[(u_i^C)^2] + \frac{1}{4}[u_i^A \times u_i^B] + \frac{1}{4}[u_i^B \times u_i^C] + \frac{1}{4}[u_i^A \times u_i^C]$$

and the ciphertext gradient of the target participating node is:

$$\left[\frac{\partial L}{\partial \theta^C}\right]_A = \sum_{i=1}^{N} -[y_i x_i^C] + \frac{1}{2}[x_i^C] + \frac{1}{4}[u_i^C x_i^C] + \frac{1}{4}[u_i^A x_i^C] + \frac{1}{4}[u_i^B x_i^C]$$

where L represents the ciphertext objective function, $y_i$ represents a global model prediction value, θ represents a model parameter of a federated sub-model corresponding to a participating node, $x_i$ represents a target feature corresponding to a participating node, $$u_i^A = \theta_A x_i^A,\ u_i^B = \theta_B x_i^B,\ u_i^C = \theta_C x_i^C,$$

$\theta^C$ represents the model parameter of the target federated sub-model, $$x_i^C$$

represents the target feature of the target participating node, and $$\left[\frac{\partial L}{\partial \theta^C}\right]_A$$

represents the ciphertext gradient encrypted with the public key of the specified participating node, wherein the computer instructions which, when being executed by the computer, causes the computer to: after sending the ciphertext gradient encrypted with the public key of the specified participating node to the electronic devices of all other participating nodes, receive a gradient result obtained by each of the electronic devices of the other participating nodes decrypting the ciphertext gradient of the target participating node, to determine the target model parameter of the target federated sub-model.

7. The electronic device of claim 5, wherein the processor is further configured to: before obtaining the target federated sub-model of the target participating node, extract a data feature from a data set as an original data feature;

calculate an information entropy of the data feature, and calculate an attribute importance degree of the data feature based on the information entropy, to optimize the data feature and obtain a data depth feature; and fuse the original data feature and the data depth feature to obtain the target feature of the target participating node.

8. The electronic device of claim 7, wherein the information entropy is calculated by the following formula:

$$H(X) = E[p(a_1), p(a_2), \ldots, p(a_n)] = -\sum_{j=1}^{n} p(a_i)\log_2 p(a_i)$$

where $p(a_i)$ represents a probability of each discrete message occurred, $H_{max}(x_i)$ is $H(X)=\log_2 n$, representing a maximum information entropy; and the attribute importance degree is calculated by the following formula:

$$AI_i = \frac{H_{max}(x_i) - H(x_i)}{H_{max}(x_i)}$$

where $AI_i$ represents the attribute importance degree, $H_{max}(x_i)$ represents the maximum information entropy and $H(x_i)$ represents an attribute information entropy.

9. The electronic device of claim 5, wherein the processor is further configured to:

send an encrypted authorization request for the federated sub-model to the electronic devices of the other participating nodes;

verify each of the other participating nodes based on a smart contract and determining whether to authorize the respective participating node, and send an authorization token to the electronic devices of the other participating nodes based on a determination result; and receive authorization tokens from the electronic devices of the other participating nodes to complete an on-chain authorization of the federated sub-model.

10. The non-transitory computer-readable storage medium of claim 6, wherein the computer instructions which, when being executed by the computer, cause the computer to: before obtaining the target federated sub-model of the target participating node, extract a data feature from a data set as an original data feature;

calculate an information entropy of the data feature, and calculate an attribute importance degree of the data feature based on the information entropy, to optimize the data feature and obtain a data depth feature; and fuse the original data feature and the data depth feature to obtain the target feature of the target participating node.

11. The non-transitory computer-readable storage medium of claim 10, wherein the information entropy is calculated by the following formula:

$$H(X) = E[p(a_1), p(a_2), \ldots, p(a_n)] = -\sum_{j=1}^{n} p(a_i)\log_2 p(a_i)$$

where $p(a_i)$ represents a probability of each discrete message occurred, $H_{max}(x_i)$ is $H(X)=\log_2 n$, representing a maximum information entropy; and the attribute importance degree is calculated by the following formula:

$$AI_i = \frac{H_{max}(x_i) - H(x_i)}{H_{max}(x_i)}$$

where $AI_i$ represents the attribute importance degree, $H_{max}(x_i)$ represents the maximum information entropy and $H(x_i)$ represents an attribute information entropy.

* * * * *